United States Patent
Goldner et al.

(10) Patent No.: US 10,107,886 B2
(45) Date of Patent: Oct. 23, 2018

(54) FIBER OPTIC PERSONNEL SAFETY SYSTEMS AND METHODS OF USING THE SAME

(71) Applicant: Avalon Sciences Ltd, Somerset (GB)

(72) Inventors: Eric Lee Goldner, Valencia, CA (US); Gerald Robert Baker, West Hills, CA (US); James Kengo Andersen, Westlake Village, CA (US); Agop Hygasov Cherbettchian, Santa Monica, CA (US); Jeffrey Carl Buchholz, Cross Plains, WI (US)

(73) Assignee: Avalon Sciences Ltd., Somerset (GB)

( * ) Notice: Subject to any disclaimer, the term of this patent is extended or adjusted under 35 U.S.C. 154(b) by 0 days.

(21) Appl. No.: 15/644,322

(22) Filed: Jul. 7, 2017

(65) Prior Publication Data

US 2017/0307720 A1    Oct. 26, 2017

Related U.S. Application Data

(60) Division of application No. 14/607,716, filed on Jan. 28, 2015, now Pat. No. 9,733,332, which is a
(Continued)

(51) Int. Cl.
*G01N 21/84*  (2006.01)
*G01H 9/00*   (2006.01)
(Continued)

(52) U.S. Cl.
CPC ............ *G01S 1/72* (2013.01); *G01D 5/35354* (2013.01); *G01H 9/004* (2013.01); *H04Q 9/00* (2013.01); *H04R 23/008* (2013.01); *G08G 1/04* (2013.01)

(58) Field of Classification Search
CPC .. H04J 14/0227; H04J 3/0682; H04B 10/077; H04B 10/07955; G01N 21/64; G01V 1/226
See application file for complete search history.

(56) References Cited

U.S. PATENT DOCUMENTS 4,021,792 A * 5/1977 Ludt .................... G08B 17/103
                                                  250/574
4,155,005 A   5/1979 Knowlton et al.
(Continued)

FOREIGN PATENT DOCUMENTS

CN    2643296      9/2004
CN    101199413    8/2008
(Continued)

OTHER PUBLICATIONS

1st Office Action dated May 31, 2013 issued by the State Intellectual Property Office (SIPO) of the People's Republic of China for Chinese Patent Application No. 201080047796.6.
(Continued)

*Primary Examiner* — Oommen Jacob
(74) *Attorney, Agent, or Firm* — Stradley Ronon Stevens & Young, LLP

(57) ABSTRACT

A personnel monitoring system. The personnel monitoring system includes a host node having an optical source for generating optical signals, and an optical receiver. The personnel monitoring system also includes a plurality of fiber optic sensors for converting at least one of vibrational and acoustical energy to optical intensity information, each of the fiber optic sensors having: (1) at least one length of optical fiber configured to sense at least one of vibrational and acoustical energy; (2) a reflector at an end of the at least one length of optical fiber; and (3) a field node for receiving optical signals from the host node, the field node transmitting optical signals along the at least one length of optical
(Continued)

fiber, receiving optical signals back from the at least one length of optical fiber, and transmitting optical signals to the optical receiver of the host node.

4 Claims, 13 Drawing Sheets

Related U.S. Application Data continuation of application No. 13/321,856, filed as application No. PCT/US2011/025206 on Feb. 17, 2011, now Pat. No. 8,983,287.

(60) Provisional application No. 61/338,466, filed on Feb. 18, 2010, provisional application No. 61/367,634, filed on Jul. 26, 2010.

(51) Int. Cl.
| | |
|---|---|
| *G01B 11/16* | (2006.01) |
| *G01S 1/72* | (2006.01) |
| *G01D 5/353* | (2006.01) |
| *H04Q 9/00* | (2006.01) |
| *H04R 23/00* | (2006.01) |
| *G08G 1/04* | (2006.01) |

(56) References Cited

U.S. PATENT DOCUMENTS

| | | | | |
|---|---|---|---|---|
| 4,255,015 | A | | 3/1981 | Adams et al. |
| 4,292,628 | A | | 9/1981 | Sadler |
| 4,533,834 | A | * | 8/1985 | McCormack ........... F23N 5/082 |
| | | | | 250/227.11 |
| 4,663,612 | A | * | 5/1987 | Mejia .................... G01V 3/105 |
| | | | | 340/572.4 |
| 4,800,267 | A | | 1/1989 | Freal et al. |
| 4,826,322 | A | | 5/1989 | Philips |
| 4,879,755 | A | | 11/1989 | Stolarczyk et al. |
| 4,893,930 | A | | 1/1990 | Garrett et al. |
| 4,994,668 | A | | 2/1991 | Lagakos et al. |
| 5,011,262 | A | | 4/1991 | Layton |
| 5,051,799 | A | | 9/1991 | Paul et al. |
| 5,172,117 | A | | 12/1992 | Mills et al. |
| 5,227,857 | A | | 7/1993 | Kersey |
| 5,341,126 | A | * | 8/1994 | Boykin ............... G08B 21/0247 |
| | | | | 324/234 |
| 5,367,376 | A | | 11/1994 | Lagakos et al. |
| 5,397,891 | A | | 3/1995 | Udd et al. |
| 5,493,390 | A | | 2/1996 | Varasi et al. |
| 5,576,697 | A | * | 11/1996 | Nagashima .......... G08B 17/107 |
| | | | | 250/574 |
| 5,680,489 | A | * | 10/1997 | Kersey ............... G01D 5/35383 |
| | | | | 356/35.5 |
| 5,712,932 | A | | 1/1998 | Alexander et al. |
| 5,798,834 | A | | 8/1998 | Brooker |
| 5,986,749 | A | * | 11/1999 | Wu ........................... G01V 1/22 |
| | | | | 356/35.5 |
| 6,104,492 | A | | 8/2000 | Giles et al. |
| 6,157,711 | A | | 12/2000 | Katz |
| 6,281,976 | B1 | | 8/2001 | Taylor et al. |
| 6,328,837 | B1 | | 12/2001 | Vohra et al. |
| 6,381,048 | B1 | | 4/2002 | Chraplyvy et al. |
| 6,453,022 | B1 | | 9/2002 | Weinman, Jr. |
| 6,654,521 | B2 | | 11/2003 | Sheng et al. |
| 6,819,812 | B2 | | 11/2004 | Kochergin et al. |
| 6,891,621 | B2 | | 5/2005 | Berg et al. |
| 6,900,726 | B2 | | 5/2005 | Graves |
| 6,943,931 | B1 | | 9/2005 | Dingel |
| 7,013,729 | B2 | | 3/2006 | Knudsen et al. |
| 7,282,697 | B2 | | 10/2007 | Thomas et al. |
| 7,683,312 | B2 | | 3/2010 | Goldner et al. |
| 7,840,105 | B2 | | 11/2010 | Goldner et al. |
| 7,994,469 | B2 | | 8/2011 | Goldner et al. |
| 7,999,946 | B2 | | 8/2011 | Andersen et al. |
| 8,401,354 | B2 | | 3/2013 | Goldner et al. |
| 2002/0063866 | A1 | | 5/2002 | Kersey et al. |
| 2002/0064331 | A1 | | 5/2002 | Davis et al. |
| 2002/0064332 | A1 | | 5/2002 | Martin |
| 2003/0081282 | A1 | * | 5/2003 | Yamakawa ........ H04B 10/0793 |
| | | | | 398/79 |
| 2003/0094281 | A1 | * | 5/2003 | Tubel ..................... E21B 47/00 |
| | | | | 166/250.03 |
| 2003/0145654 | A1 | | 8/2003 | Knudsen et al. |
| 2004/0046111 | A1 | | 3/2004 | Swierkowski |
| 2004/0060697 | A1 | | 4/2004 | Tilton |
| 2004/0221296 | A1 | * | 11/2004 | Ogielski ................. H04L 41/00 |
| | | | | 719/313 |
| 2004/0233784 | A1 | * | 11/2004 | Bernard ................. B63C 11/42 |
| | | | | 367/99 |
| 2004/0246816 | A1 | | 12/2004 | Ogle |
| 2005/0076713 | A1 | | 4/2005 | Knudsen |
| 2005/0097955 | A1 | | 5/2005 | Berg et al. |
| 2005/0111788 | A1 | | 5/2005 | Tsuyama |
| 2006/0120675 | A1 | | 6/2006 | Goldner et al. |
| 2007/0065149 | A1 | | 3/2007 | Stevens et al. |
| 2008/0089681 | A1 | * | 4/2008 | Yano .................. H04B 10/0773 |
| | | | | 398/33 |
| 2008/0137589 | A1 | | 6/2008 | Barrett |
| 2008/0282933 | A1 | * | 11/2008 | Daeubler ................. C23C 4/02 |
| | | | | 106/286.2 |
| 2009/0006540 | A1 | * | 1/2009 | Liu ........................ G07C 5/008 |
| | | | | 709/203 |
| 2009/0101800 | A1 | | 4/2009 | Goldner et al. |
| 2009/0140852 | A1 | | 6/2009 | Stolarczyk et al. |
| 2009/0210168 | A1 | | 8/2009 | Vincelette |
| 2010/0005860 | A1 | | 1/2010 | Coudray et al. |
| 2010/0156636 | A1 | * | 6/2010 | Inomata ............ G08B 13/19695 |
| | | | | 340/541 |
| 2010/0219334 | A1 | | 9/2010 | LeGrand |
| 2010/0247111 | A1 | * | 9/2010 | Li ......................... H04B 10/299 |
| | | | | 398/177 |
| 2013/0025375 | A1 | * | 1/2013 | Goldner .................. G01V 1/226 |
| | | | | 73/655 |
| 2013/0034351 | A1 | * | 2/2013 | Goldner ............. G01D 5/35354 |
| | | | | 398/25 |
| 2013/0201484 | A1 | * | 8/2013 | Goldner ................. G01V 1/226 |
| | | | | 356/460 |

FOREIGN PATENT DOCUMENTS

| | | |
|---|---|---|
| JP | 2001-221684 | 8/2001 |
| JP | 2006-172339 | 6/2006 |
| JP | 2007-232515 | 9/2007 |
| KR | 10-1997-002776 | 1/1997 |
| KR | 10-2002-0008457 | 1/2002 |
| WO | 1999/05493 | 2/1999 |
| WO | 2009/076836 | 6/2009 |
| WO | 2011/050227 | 4/2011 |

OTHER PUBLICATIONS

International Search Report for International Application No. PCT/US2010/025248 issued by the Korean Intellectual Property Office dated Oct. 11, 2011.
International Search Report for International Application No. PCT/US2010/053659 issued by the Korean Intellectual Property Office dated Aug. 2, 2011.
International Search Report for International Application No. PCT/US2010/053763 issued by the Korean Intellectual Property Office dated Jul. 28, 2011.
International Search Report for International Application No. PCT/US2011/024465 issued by the Korean Intellectual Property Office dated Oct. 27, 2011.
International Search Report for International Application No. PCT/US2012/022356 issued by the Korean Intellectual Property Office dated Sep. 3, 2012.
International Search Report for International Application No. PCT/US2012/028224 issued by the Korean Intellectual Property Office dated Sep. 24, 2012.

(56) References Cited

OTHER PUBLICATIONS

International Search Report for International Application No. PCT/US2012/051338 issued by the Korean Intellectual Property Office dated Mar. 14, 2013.

* cited by examiner

FIBER OPTIC PERSONNEL SAFETY SYSTEMS AND METHODS OF USING THE SAME

RELATED APPLICATIONS

This application is a divisional application of U.S. patent application Ser. No. 14/607,716, filed Jan. 28, 2015, which is a continuation of U.S. patent application Ser. No. 13/321,856, filed Oct. 10, 2012, which is the U.S. national phase of International Application No. PCT/US 2011/025206 filed on Feb. 17, 2011, which claims priority of U.S. Provisional Application No. 61/338,466 filed on Feb. 18, 2010, and U.S. Provisional Application No. 61/367,634 filed on Jul. 26, 2010.

TECHNICAL FIELD

This invention relates generally to tracking of personnel such as within a mine or aboard a large marine vessel and, more particularly, to improved systems and methods for tracking of personnel using fiber optics.

BACKGROUND OF THE INVENTION

The mining industry has always been beset with disasters. Such disasters may be caused by explosions or cave-ins, and have resulted in serious injury and/or death to workers. Many of these injuries to miners (and deaths) could have been prevented had adequate systems been in place for tracking the locations of miners within a mine, and had adequate communications been in place between surface personnel and miners after electrical power in the mine had been severed. In 2006, the United States Congress identified a need for improved mining safety equipment, including the ability to track personnel at all times and to provide bi-directional communications following a disaster without the need for local (in-mine) electrical power.

Systems have been proposed and developed to address these concerns, but such systems suffer from significant drawbacks. For the needed bi-directional communications, relayed 2-way radios have been employed; however, such radios typically utilize a number of fixed stations, each requiring electrical power. Further, communication ranges of such 2-way radios tend to be too short for many mining applications. Still further, radio frequency (RF) communications are poor in many mining environments. For personnel tracking, coaxial cable systems have been proposed; however, they are known to have leakage issues that inhibit their effectiveness. Radio frequency identification (RFID) systems have also been proposed; however, such systems are typically arranged in a daisy chain configuration with multiple fixed stations, each requiring local electrical power.

Thus, a need exists for, and it would be desirable to provide improved systems for, monitoring and/or tracking of personnel.

BRIEF SUMMARY OF THE INVENTION

To meet this and other needs, and in view of its purposes, the present invention provides a personnel monitoring system. The personnel monitoring system includes a host node including an optical source for generating optical signals, and an optical receiver. The optical detection system also includes a plurality of fiber optic sensors for converting vibrational energy to optical intensity information, each of the fiber optic sensors including: (1) at least one length of optical fiber configured to sense vibrational energy; (2) a reflector at an end of the at least one length of optical fiber; and (3) a field node for receiving optical signals from the host node, the field node transmitting optical signals along the at least one length of optical fiber, the field node receiving optical signals back from the at least one length of optical fiber, and the field node transmitting optical signals to the optical receiver of the host node.

According to another exemplary embodiment of the present invention, a method of operating a personnel monitoring system is provided. The method includes the steps of: (a) storing a plurality of predetermined characteristics of events to be monitored using an optical detection system in memory; (b) comparing a detected characteristic obtained from the optical detection system to the plurality of predetermined characteristics stored in memory; and (c) determining if there is an acceptable level of matching between the detected characteristic and at least one of the plurality of predetermined characteristics stored in memory.

According to an exemplary embodiment of the present invention, another personnel monitoring system is provided. The personnel monitoring system includes a host node having an optical source for generating optical signals, and an optical receiver. The personnel monitoring system also includes a fiber optic sensing cable having at least one sensing zone, the at least one sensing zone being bound by a pair of Fiber Bragg Gratings of the fiber optic sensing cable.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Figure 1A:
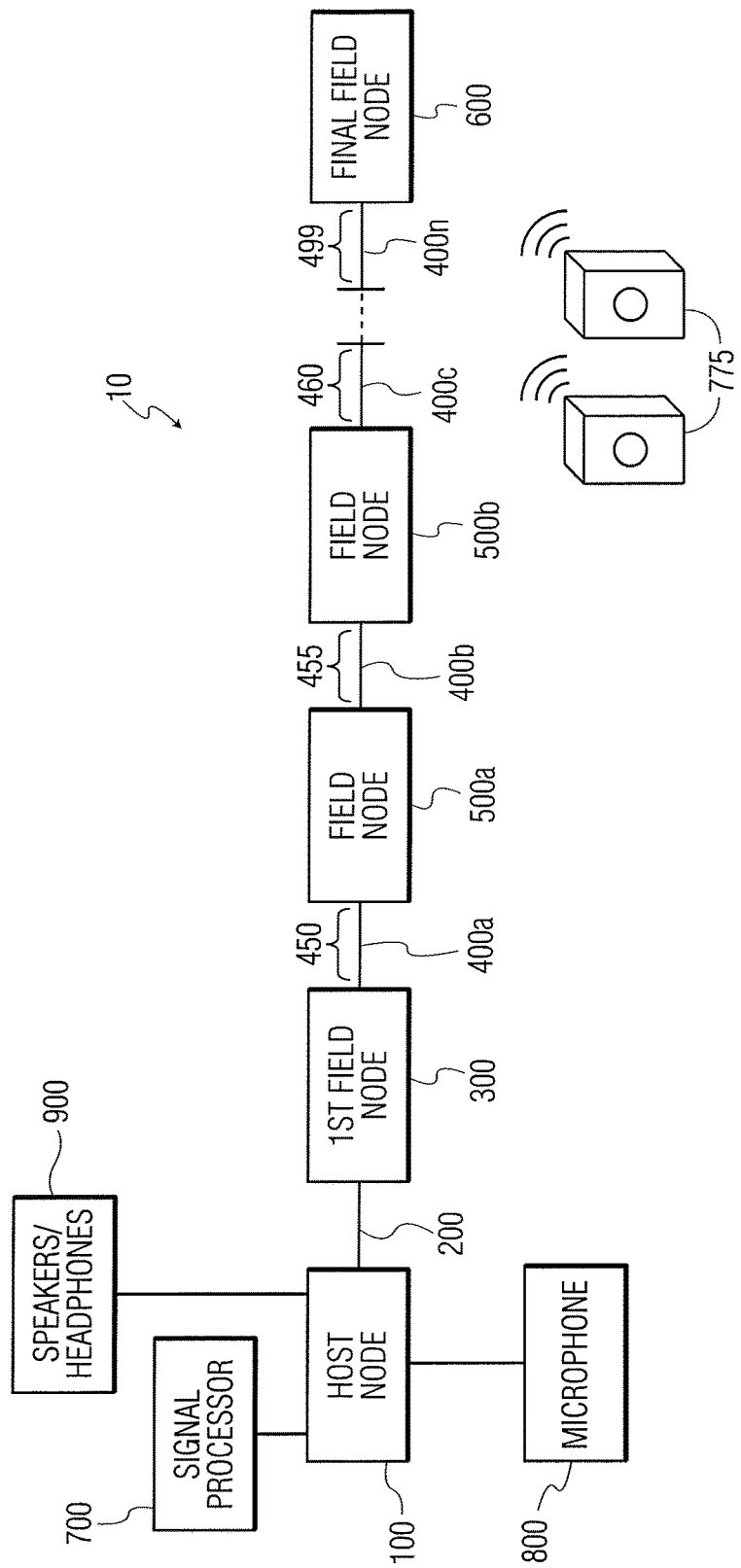
FIG. 1A is a block diagram illustrating an optical detection system in accordance with an exemplary embodiment of the present invention.

In order to enable detection and communication in connection with a personnel safety system (e.g., a mine safety system, or other personnel safety system), it is desirable to have a high fidelity electronic representation of an event (e.g., acoustic vibration, mechanical vibration, etc.). According to certain exemplary embodiments of the present invention, an optical detection system for personnel safety is provided which utilizes interferometers with high linearity and dynamic range (e.g., certain linearized Sagnac interferometers). The optical detection systems may also include a low noise, low distortion, optical receiver.

In certain more specific exemplary embodiments of the present invention, optical detection systems for personnel safety are provided which utilize an integrated sensor array (e.g., including a sensing cable divided into sensing zones which may be arranged to include a series of linearized Sagnac interferometers) for monitoring systems and locations. Such optical detection systems may include a host node having an interrogation sub-system and a signal processor.

In other exemplary embodiments of the present invention, a contiguous array of Fiber Bragg Grating (i.e., FBG) bounded interferometers (e.g., Fabry-Perot interferometers) interrogated by a Time Division Multiplexing (i.e., TDM) interferometric demodulator is provided.

Through various exemplary embodiments of the present invention, passive fiber optic personnel safety systems are provided. Use of passive fiber optic sensing allows for the omission of electrical power for operation of the sub-systems residing within the mine or other area to be monitored.

In yet another embodiment, bi-directional communications are included in the fiber optic detection system (e.g., in a mine, vessel, or other location). In a mine application, passive uplink communications from within the mine to a mine office (e.g., a control room) are enabled by high sensitivity detection of voice at particular field nodes by use of fiber optic microphones. The microphones are parts of the sensing zones used for tracking individuals in the mine. Within the sensors, the acoustic voice information is converted to optical phase signals, and then into optical intensity signals. At the host node, these optical intensity signals are converted into electric, and then acoustic, signals for audible detection of the in-mine voices.

Further, to complete the bi-directional communications, optical downlink communication from the mining office to the mine is provided. This is accomplished by conversion of voice acoustics into electrical signals via a microphone and amplifier. The electrical signal is then imposed upon the output of a laser via Pulse Width Modulation (PWM) or other suitable mechanisms. The resultant optical signal is transmitted along an optical fiber of a fiber optic cable into the mine. At particular locations in the mine, fiber optic earphones are provided for reception of the voice signals generated in the mine office. The optical signal is received at an optical earplug where a photodetector causes an optical-to-electrical conversion. Part of the electrical energy is rectified, filtered, and used as bias energy for a small electrical circuit that converts the electrical signal to a baseband (demodulated) acoustic signal output through a miniature loudspeaker within the earphone for audible detection by a miner.

Referring now to the drawings, in which like reference numbers refer to like elements throughout the various figures that comprise the drawing, FIG. 1A illustrates an optical detection system 10. Optical detection system 10 includes a plurality of fiber optic cables (i.e., optical sensing cables) 400a, 400b, 400c . . . 400n (which may be termed transducers) configured into separate sensing zones 450, 455, 460 . . . , 499. Optical detection system 10 also includes a host node 100 and a plurality of field nodes. The field nodes include a first field node 300, intermediate field nodes 500a, 500b, etc., and a final field node 600. Optical detection system 10 also includes a lead cable 200 (e.g., a lead cable for telemetry of probe and return signals from each of the zones, a length of such lead cable being application dependent, with an exemplary lead cable being on the order of meters to kilometers in length) which runs between host node 100 and first field node 300, lead cable 200 preferably being acoustically and vibrationally insensitive. In the example shown in FIG. 1A, optical detection system 10 includes a single host node 100, and a single first field node 300. Depending on the exact configuration of the system (e.g., the number of sensing zones, the length of the cables covering each of the sensing zones, etc.), there may be a plurality of host nodes, first field nodes, etc., as is desired in the given application.

An exemplary operation of the configuration illustrated in FIG. 1A may be summarized as follows. Host node 100 (which works in conjunction with a signal processor 700) generates optical signals and transmits the signals along lead cable 200 to first field node 300 (e.g., where the elements and configuration of optical detection system 10, including lead cable 200, are selected to minimize the lead cable sensitivity to vibration). As will be detailed below, part of the optical signals from host node 100 (intended for use in monitoring sensing zone 450) are transmitted through first field node 300, along optical sensing cable 400a, are reflected back after reaching intermediate field node 500a, the reflected signals returning along optical sensing cable 400a, and the signals ultimately returning to host node 100 and signal processor 700 for processing. Another part of the optical signals from host node 100 (intended for use in monitoring sensing zone 455) is transmitted through first field node 300, along optical sensing cable 400a, through intermediate field node 500a, along optical sensing cable 400b, is reflected back after reaching intermediate field node 500b, the reflected signals returning along optical sensing cables 400b, 400a, and the signals ultimately returning to host node 100 and signal processor 700 for processing. A similar process occurs for each subsequent sensing zone. As is clear in FIG. 1A, subsequent sensing zones (as indicated by zones 460 . . . 499) are contemplated, with the final sensing zone terminating with final field node 600.

The system described above with respect to FIG. 1A allows for sensing of various acoustic and mechanical vibration events. FIG. 1A also illustrates beacons 775. In an exemplary personnel safety system (e.g., a mine safety system), each person to be monitored (e.g., each miner) carries one of beacons 775. Each beacon 775 emits unique acoustic vibrations (e.g., acoustic vibrations at a unique and predetermined frequency) that are previously known to the system and are detected by optical sensing cables 400a, 400b, etc. Prior to entering a monitored area, each individual is associated with a particular beacon 775 by any suitable mechanism.

FIG. 1A also illustrates a microphone 800 and one or more speakers/headphones 900. As will be explained below in connection with FIG. 1B, these elements, in combination with like elements (e.g., a fiber optic microphone 510a and a fiber optic earplug 510b in FIG. 6) in the mine (or other location to be monitored), form the basis for a fiber optic bi-directional communications system requiring no electrical power locally along the full sensing array.

Figure 1B:
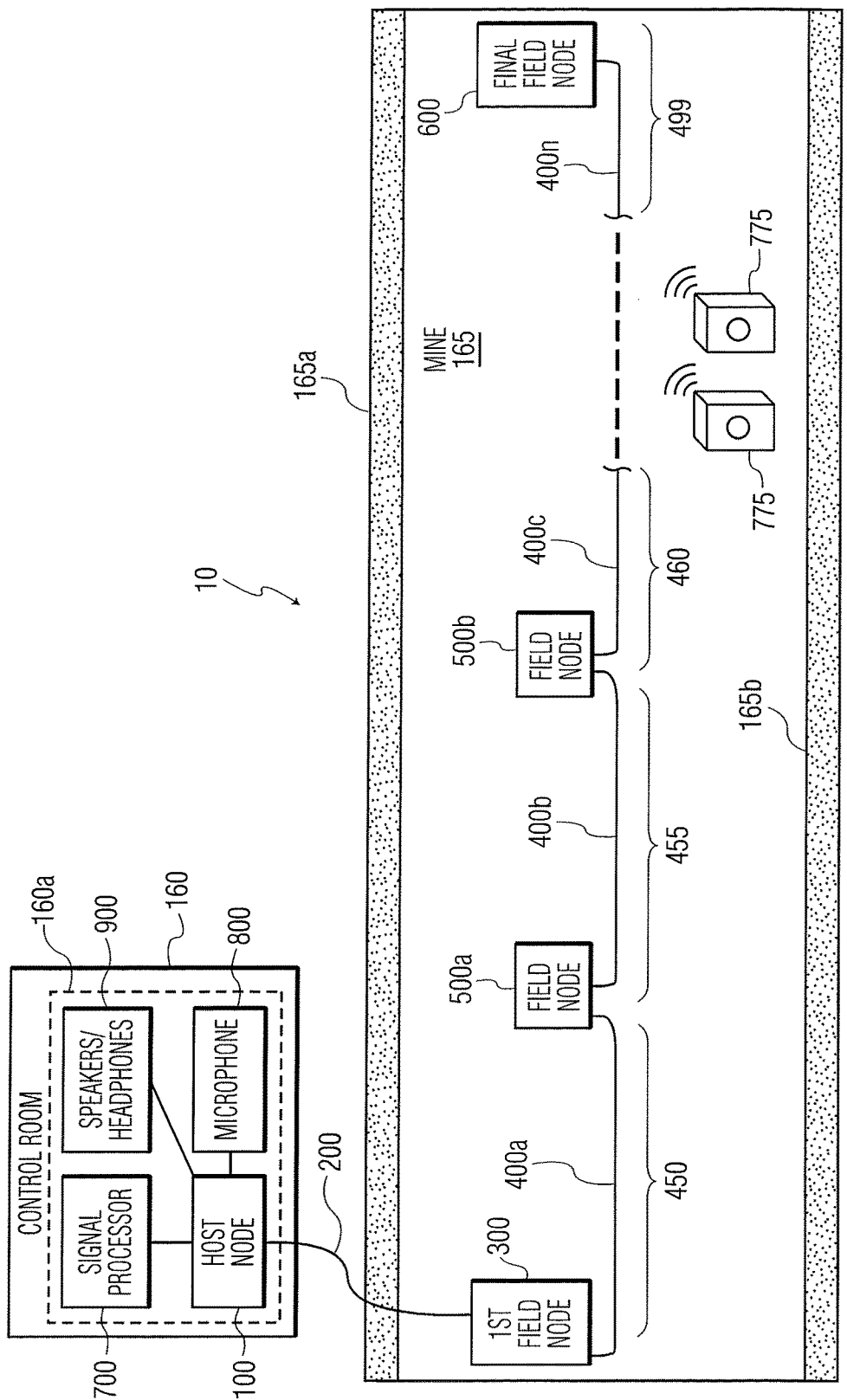
FIG. 1B is a block diagram illustrating the optical detection system of FIG. 1A used in connection with a mine in accordance with an exemplary embodiment of the present invention.

FIG. 1B illustrates optical detection system 10 of FIG. 1A used in a mine monitoring application. In FIG. 1B, host node 100 and signal processor 700 are housed in a control room 160 or other desirable environment (e.g., a remote, stable environment). FIG. 1B illustrates optical detection system 10 configured to sense disturbances (e.g., presence of miners' beacons, voices, etc.) within a mine 165 (e.g., below ground level 165a and above mine floor 165b), where each sensing zone 450, 455, 460 . . . 499, corresponds to a given area of mine 165.

As provided above, each beacon 775 emits unique acoustic vibrations (e.g., acoustic vibrations at one or more unique and predetermined frequencies) that are detected by optical sensing cables 400a, 400b, etc. As will be understood by those skilled in the art, control room electronics 160a transmit optical energy to the optical sensing cables, and optical energy is returned from each of the sensing zones 450, 455, 460 . . . 499 along lead cable 200 (where the optical energy is changed by the received acoustic vibrations). Control room electronics 160a can distinguish one beacon 775 from another (because of the unique signature of the optical signals based on the frequencies or temporal characteristics of the signals emitted by a given beacon 775), and as such, personnel wearing beacon 775 (e.g., a miner wearing a beacon) may be tracked as they move from one sensing zone 450, 455, 460 . . . 499 to another sensing zone 450, 455, 460 . . . 499.

As provided above, microphone 800 in control room 160 receives human voices (an acoustic signal) in control room 160, and together with other elements of host node 100 converts the acoustic signal into an electrical signal, and the electrical signal is converted to an optical signal transmitted along the fiber optic array (including lead cable 200 and optical sensing cables 400a, 400b, etc.). This may be accomplished, for example, by Pulse Width Modulation of the injection current to a laser based upon the electrical signal from the converted acoustic voices. In an exemplary embodiment, Pulse Width Modulation is applied at a frequency on the order of 10 kHz. The optical signal is received at a field node (e.g., such as field node 500a shown in FIG. 6), where the optical signal containing the voice information travels along a length of optical fiber (e.g., including fiber portion 510b1 in FIG. 6) to a fiber optical earplug 510b where such optical signal is again converted to an electrical signal, and then converted to an acoustic signal at fiber optical earplug 510b. An exemplary method to achieve this conversion is the reception of the voice-encoded optical signal by a photodetector which causes an optical-to-electrical conversion. Part of the electrical energy is rectified, filtered, and used as bias energy for a small electrical circuit that converts the electrical signal to a baseband (demodulated) acoustic signal output through a miniature loudspeaker within earplug 510b for audible detection by a miner or other personnel.

Figure 6:
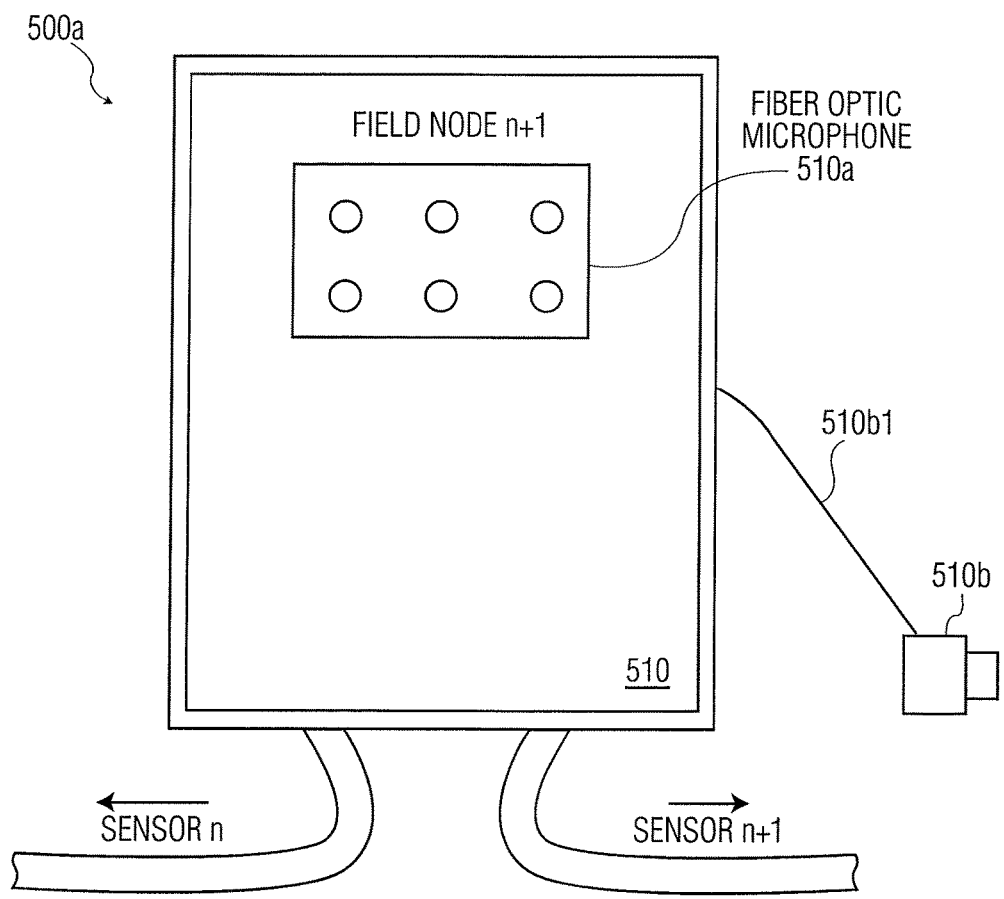
FIG. 6 is an external illustration of an intermediate field node of an optical detection system in accordance with an exemplary embodiment of the present invention.

Field node 500a shown in FIG. 6 also includes a fiber optic microphone 510a which receives an acoustic signal (e.g., the voice of a miner in the mine). For example, microphone 510a may be included in a delay coil 540 (see FIG. 4) of the Sagnac interferometer at the field node 500a, may be included in a distinct fiber length in an enclosure 510 (e.g., a small coil of fiber connected between a sensing cable and a reflector in enclosure 510), or may be included as part of the sensing fiber prior to the sensing fiber exiting enclosure 510, etc. Regardless of the configuration of microphone 510a, microphone 510a may be best exposed to the acoustic voice signal when a miner removes a protective cover (not shown) from enclosure 510 to gain access to both fiber optic microphone 510a and fiber optic earplug 510b. The detected acoustic signal is converted to an optic phase signal by either delay coil 540 or the small additional coil and then converted to an intensity signal at a coupler, for example, and this optical signal is transmitted to host node 100 (e.g., along with other sensed optical information such as detected beacon signals). At host node 100, the optical signal is converted to an acoustic signal using host node 100 (e.g., with an intermediate conversion to an electrical signal). The resultant acoustic signal is heard in control room 160 using speakers/headphones 900.

Thus, miners (or other personnel in another application using this technique) may communicate with individuals in control room 160, and individuals in control room 160 may communicate with miners. Further, control room 160 can track miners using beacons 775. Thus, a two-way communication and tracking system is provided, with no requirement of electrical power in the mine (excluding batteries in beacons 775 worn by each of the miners).

Figure 1C:
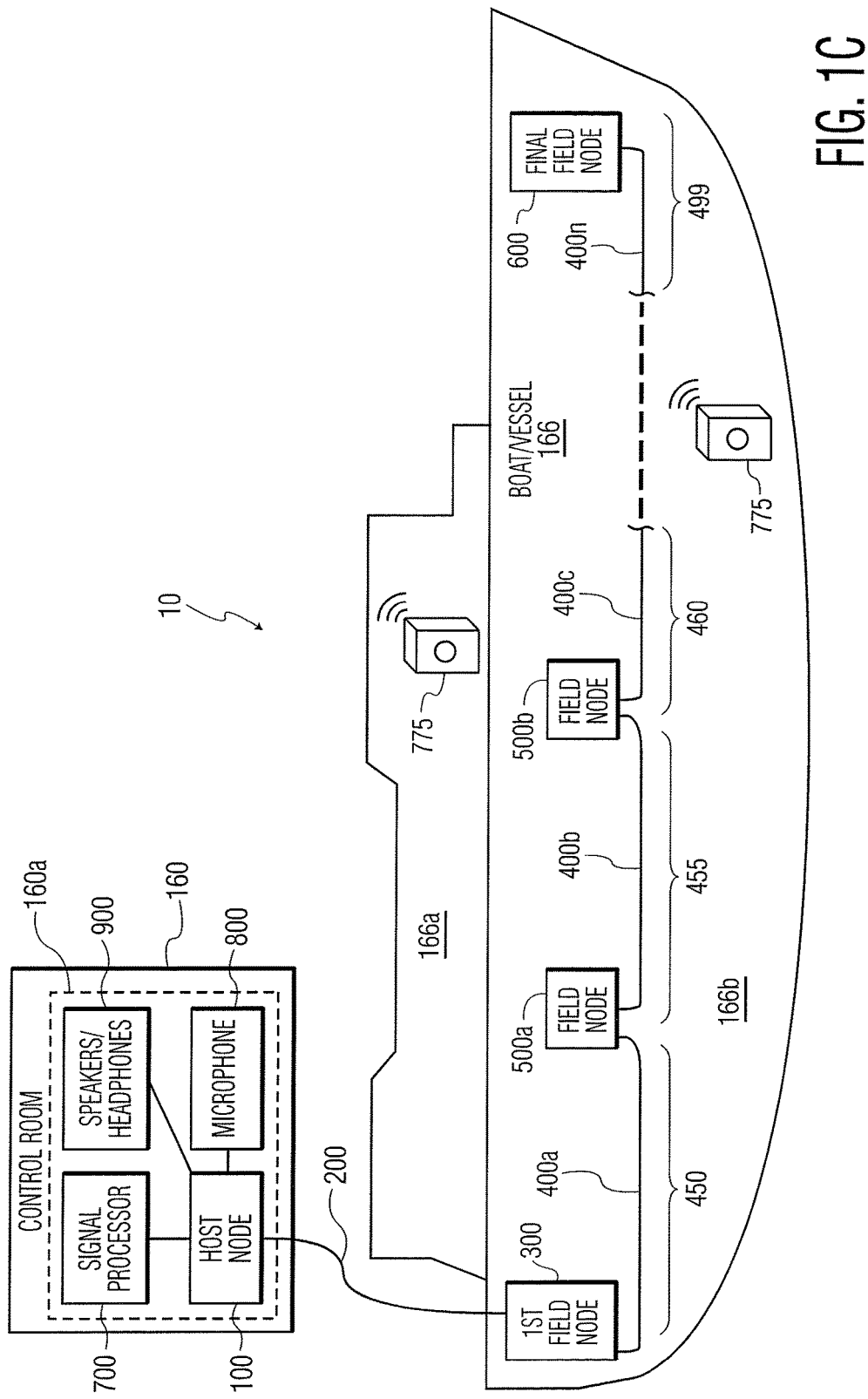
FIG. 1C is a block diagram illustrating the optical detection system of FIG. 1A used in connection with a marine vessel in accordance with an exemplary embodiment of the present invention.

FIG. 1C illustrates optical detection system 10 of FIG. 1A used in a marine vessel monitoring application. In FIG. 1C, host node 100 and signal processor 700 are housed in control room 160 or other desirable environment (e.g., a remote, stable environment). FIG. 1C illustrates optical detection system 10 configured to sense disturbances (e.g., presence of sailors/vessel personnel, acoustic beacons, voices, etc.) aboard vessel 166 (e.g., where vessel 166 includes decks 166a, 166b, etc.), where each sensing zone 450, 455, 460 . . . 499, corresponds to a given area of vessel 166. Details of the interaction of the various elements in FIG. 1C are omitted for simplicity; however, it is understood that the descriptions of like elements in connection with other drawings of the present application are applicable to FIG. 1C. Additional functionality of such elements may also be provided that is useful in a marine vessel monitoring application. For example, optical detection system 10 may be configured such that an alarm condition (or other condition notation such as an updated detection log or display) is provided when beacon 775 (e.g., worn by a sailor or other marine personnel) reaches a predetermined area of vessel

166. Examples of such a predetermined area may be: one that is off limits to certain personnel; a perimeter of vessel 166 which may indicate a man overboard; amongst others. Further, in a marine monitoring application (or other personnel monitoring application) it may be desirable to continuously monitor one or more beacons 775 (worn or carried by marine personnel) such that the location of the personnel can be monitored as desired.

Figure 1D:
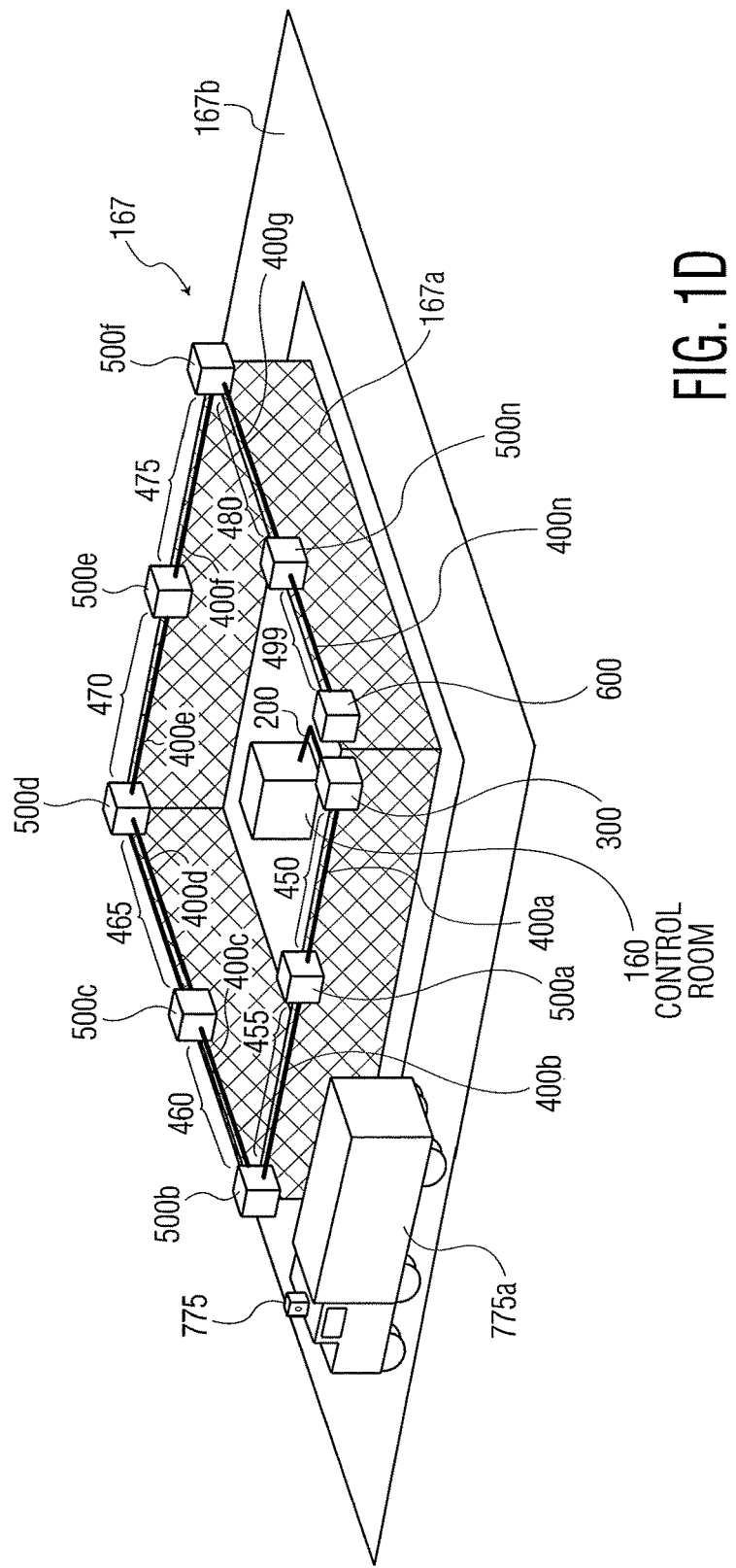
FIG. 1D is a perspective view illustrating the optical detection system of FIG. 1A used in connection with vehicle detection in accordance with an exemplary embodiment of the present invention.

FIG. 1D illustrates optical detection system 10 of FIG. 1A used in a vehicle monitoring application. That is, it is desired to monitor the location of a vehicle 775a (or personnel within vehicle 775a) using beacon 775 that is carried on or within vehicle 775a. In FIG. 1D, control room 160 (e.g., including elements of control room 160 such as those shown in FIGS. 1B and 1C) is within a fence line 167a of a region 167. Vehicle 775a travels along a roadway 167b of region 167. In the example vehicle monitoring system shown in FIG. 1D, optical sensing cables 400a, 400b, 400c, 400d, 400e, 400f, 400g, and 400n (and field nodes 300, 500a, 500b, 500c, 500d, 500e, 500f, 500n, and 600) are secured (or are provided proximate) to fence line 167a. Thus, optical detection system 10 is configured to sense, for example, the presence, absence, or location of vehicles within area 167, where each sensing zone 450, 455, 460, 465, 470, 475, 480, and 499 corresponds to a given region of area 167. Again, details of the interaction of the various elements in FIG. 1D are omitted for simplicity; however, it is understood that the descriptions of like elements (e.g., beacons 775 and control room 160) provided in connection with other drawings of the present application are also applicable to FIG. 1D. Further, while one vehicle 775a is shown in FIG. 1D, it is understood that a plurality of vehicles 775a may be monitored with optical detection system 10, each vehicle 775a having one or more beacon 775 for emitting acoustic vibrations at one or more predetermined frequencies unique to each beacon 775.

Figure 2:
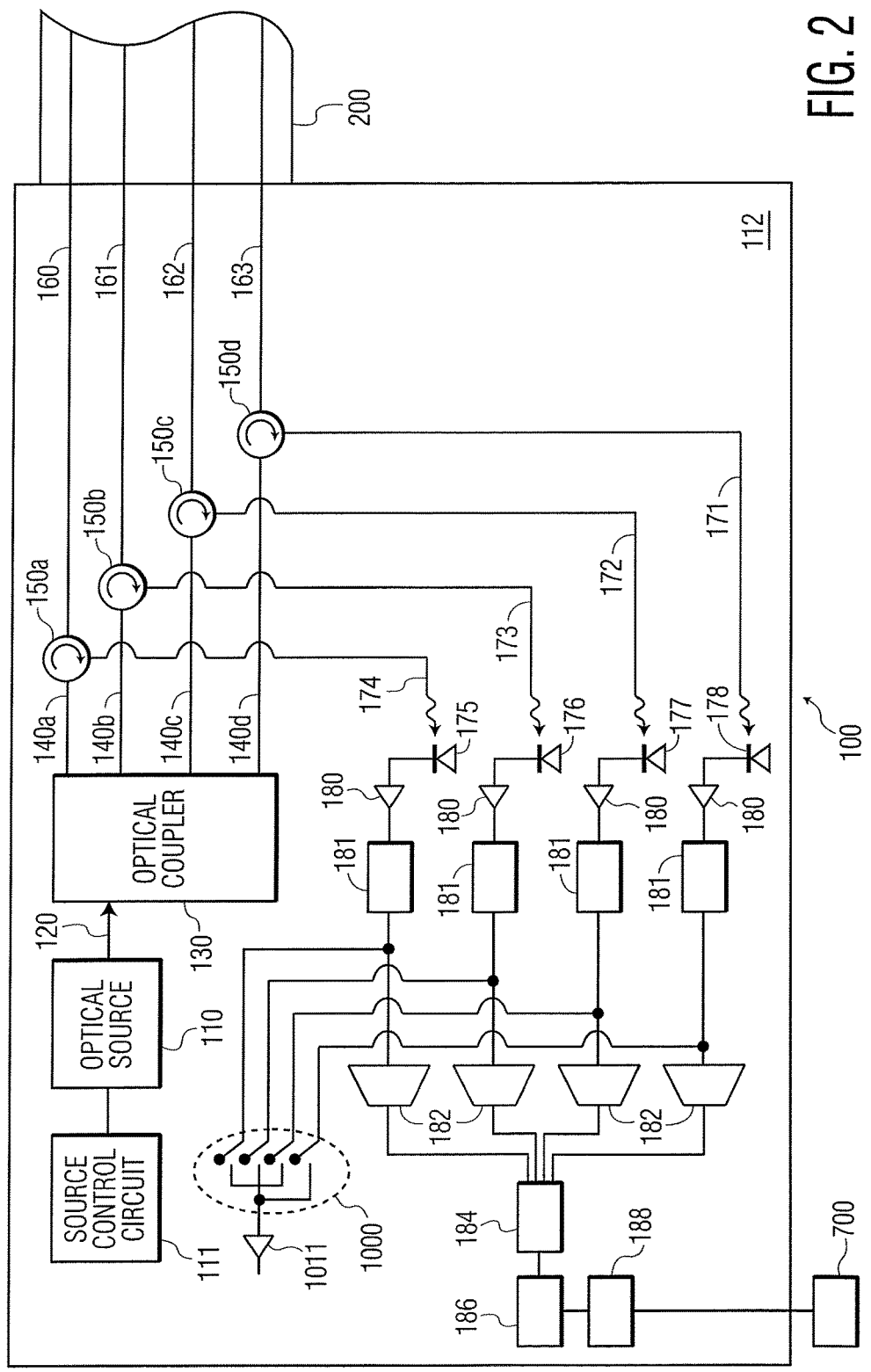
FIG. 2 is a block diagram of a host node of an optical detection system in accordance with an exemplary embodiment of the present invention.

Details of the elements of an exemplary optical detection system 10 (in any of FIGS. 1A-1D) is now described. Referring to FIG. 2, host node 100 includes one or more optical sources 110 (e.g., LED sources such as superluminescent light emitting diodes, edge emitting light emitting diodes, other light emitting diode sources, lasers, etc.) within an enclosure 112. According to an exemplary embodiment of the present invention, optical source 110 may be a broadband optical source operated in a continuous wave (CW) mode, with an exemplary spectral width being on the order of 50 nm. Optical source 110 is controlled by a source control circuit 111. In the exemplary embodiment now described (described and illustrated in connection with four sensing zones), optical source 110 is connected via an optical cable 120 to a 1×4 splitter (such as a 1×4 or 4×4 fiber optic coupler or an integrated optic splitter) labeled as optical coupler 130. Optical coupler 130 divides the light intensity output from optical source 110 into four signals along respective fibers 140a, 140b, 140c, and 140d (e.g., four substantially equal intensity signals) that are each output to a respective input lead of a corresponding optical circulator 150a, 150b, 150c, and 150d (e.g., identical optical circulators 150a, 150b, 150c, and 150d). Output signals are provided along each of fibers 160, 161, 162, 163 within fiber optic lead cable 200 from a respective one of optical circulators 150a, 150b, 150c, and 150d.

As provided above, according to certain exemplary embodiments of the present invention, linearized Sagnac interferometers are utilized. As will be appreciated by one skilled in the art, in order to provide a linearized Sagnac interferometer, the architecture of a traditional loop configuration Sagnac interferometer (e.g., typically used to sense rotation) is modified (e.g., folded) to allow measurements of phase perturbations along an optical fiber in a non-looped configuration, for example, by incorporation of a 1×2 fiber optic coupler. Referring again to FIG. 2 (and FIG. 3), light output from host node 100 travels along each of fibers 160, 161, 162, and 163 within lead cable 200 which is connected to first field node 300. First field node 300 includes an enclosure 310 which houses a series of components.

Figure 3:
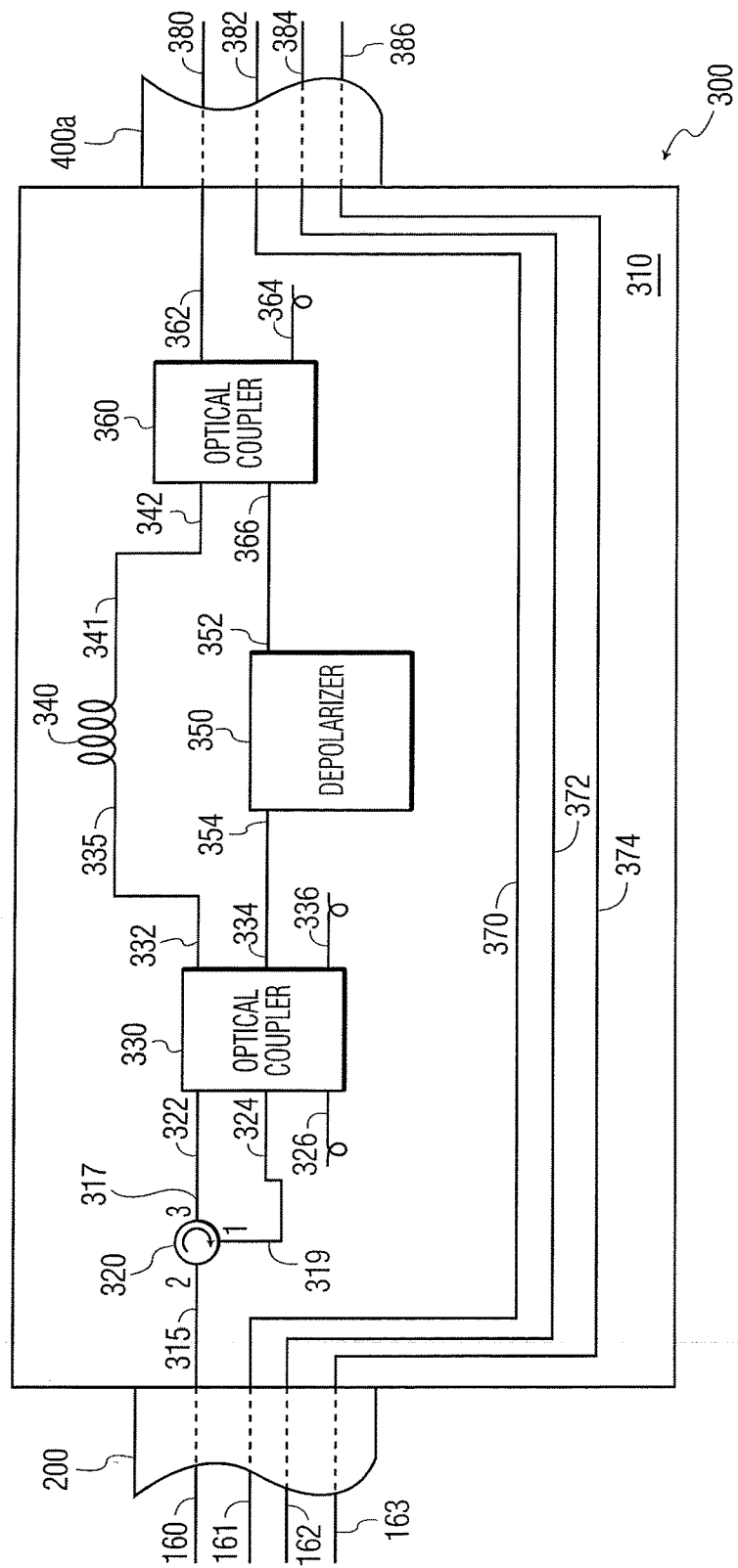
FIG. 3 is a block diagram of a first field node of an optical detection system in accordance with an exemplary embodiment of the present invention.

In FIG. 3, fiber 160 is connected to an input/output lead 315 of an optical circulator 320. A lead 317 of optical circulator 320 is connected to a lead 322 of an optical coupler 330 (e.g., a 3×3 fiber optic coupler 330). A lead 319 of optical circulator 320 is connected to a lead 324 of optical coupler 330.

A lead 332 of optical coupler 330 is connected to a lead 335 of a delay coil 340. The fiber optic delay coil 340 has a length of, for example, at least twice the length of the zone 450 of an optical fiber 380 in optical sensing cable 400a where the midpoint of the sensing loop (e.g., from one output leg of the 3×3 coupler to another) including the sensing optical fiber 380 "unfolded" is within the enclosure 310 for maximum sensitivity. A lead 341 of delay coil 340 is connected to a lead 342 of an optical coupler 360 (e.g., a 2×2 fiber optical coupler 360).

A lead 334 of optical coupler 330 is connected to a lead 354 of a depolarizer 350. A lead 326 of optical coupler 330 is tied off and/or the end crushed to minimize light that is reflected back into optical coupler 330. Similarly, a lead 336 of optical coupler 330 is tied off and/or the end crushed to minimize light that is reflected back into optical coupler 330.

Depolarizer 350 significantly reduces polarization-induced signal fading, allowing inexpensive single mode fiber to be used for all of the optical components and cable fibers rather than costly polarization-maintaining fiber. Depolarizer 350 may be one of several commercially available depolarizers, such as, for example, a recirculating coupler (single or multiple stage) or a Lyot Depolarizer. A lead 352 of depolarizer 350 is connected to a lead 366 of optical coupler 360. A lead 362 of optical coupler 360 is connected to fiber 380 in optical sensing cable 400a. A lead 364 of optical coupler 360 is tied off and/or the end crushed to minimize light that is reflected back into optical coupler 360. Although one example for optical coupler 360 is a 2×2 fiber optic coupler, optical coupler 360 is not limited to that embodiment. For example, a 1×2 fiber optic coupler may be used instead of a 2×2 fiber optic coupler 360, thereby obviating the tying off of second output lead 364.

Fibers 161, 162, and 163 in lead cable 200 are connected to fibers 370, 372, and 374 in field node 300, respectively. These are pass-through fibers not actively used in first field node 300 or within zone 450, but rather to be used in connection with sensing in other nodes and other zones. Fibers 370, 372, and 374 are connected to fibers 382, 384, and 386 in optical sensing cable 400a, respectively. Fiber 380 in optical sensing cable 400a is used for sensing within zone 450. Fiber 380 in optical sensing cable 400a (which had been used for sensing in zone 450) is attached to a fiber 580 in intermediate field node 500a (see FIG. 4). Fiber 580 is connected to a reflector 581 (e.g., broadband reflector 581). Disturbances along sensing cable 400a cause small changes in the length of fiber 380. These changes cause non-reciprocal changes in the phase of the light travelling through the Sagnac interferometer.

An exemplary operation of first field node 300 shown in FIG. 3 (and partially in FIG. 4) is now provided. An optical signal (i.e., light from host node 100 entering first field node 300) propagates along fiber 160 to lead 315 and enters port 2 of optical circulator 320, and then exits port 3 of optical circulator 320 through lead 317, and then propagates along lead 322 (a length of optical fiber) to optical coupler 330. Optical coupler 330 divides the light into optical signals along two counterpropagating paths: a first path of the divided light extends from lead 332 to delay coil 340 along lead 335, and then from lead 341 to optical coupler 360 through lead 342; a second path of the divided light extends from lead 334 to depolarizer 350 through lead 354, and then from lead 352 to optical coupler 360 through lead 366. Thus, the light along the first path is delayed with respect to the light along the second path by a time approximately proportional to the length of delay coil 340. The two counterpropagating optical signals recombine at optical coupler 360, and the recombined optical signal exits optical coupler 360 along lead 362, and then travels along fiber 380 (for sensing within zone 450) of optical sensing cable 400a. The recombined optical signal enters field node 500a on fiber 380, and propagates along lead 580 to reflector 581, and is then reflected back along fiber 380 to first field node 300. This reflected signal is divided into two optical signals by optical coupler 360, where each of the optical signals travels along a counterpropagating path and recombines coherently at optical coupler 330. The result of the optical signals counter propagating through the node and zones and recombining at optical coupler 330 is that the recombined light has an intensity output proportional to the phase perturbation from the original disturbance along fiber 380 within optical sensing cable 400a. This optical signal (having a variable intensity) is output from optical coupler 330 along lead 324 (i.e., fiber 324) and then along lead 319 into port 1 of optical circulator 320. This optical signal propagates from port 1 to port 2 of optical circulator 320, and then along lead 315 to fiber 160 of lead cable 200. The signal is transmitted along fiber 160 of lead cable 200 to the interrogator of host node 100.

Figure 4:
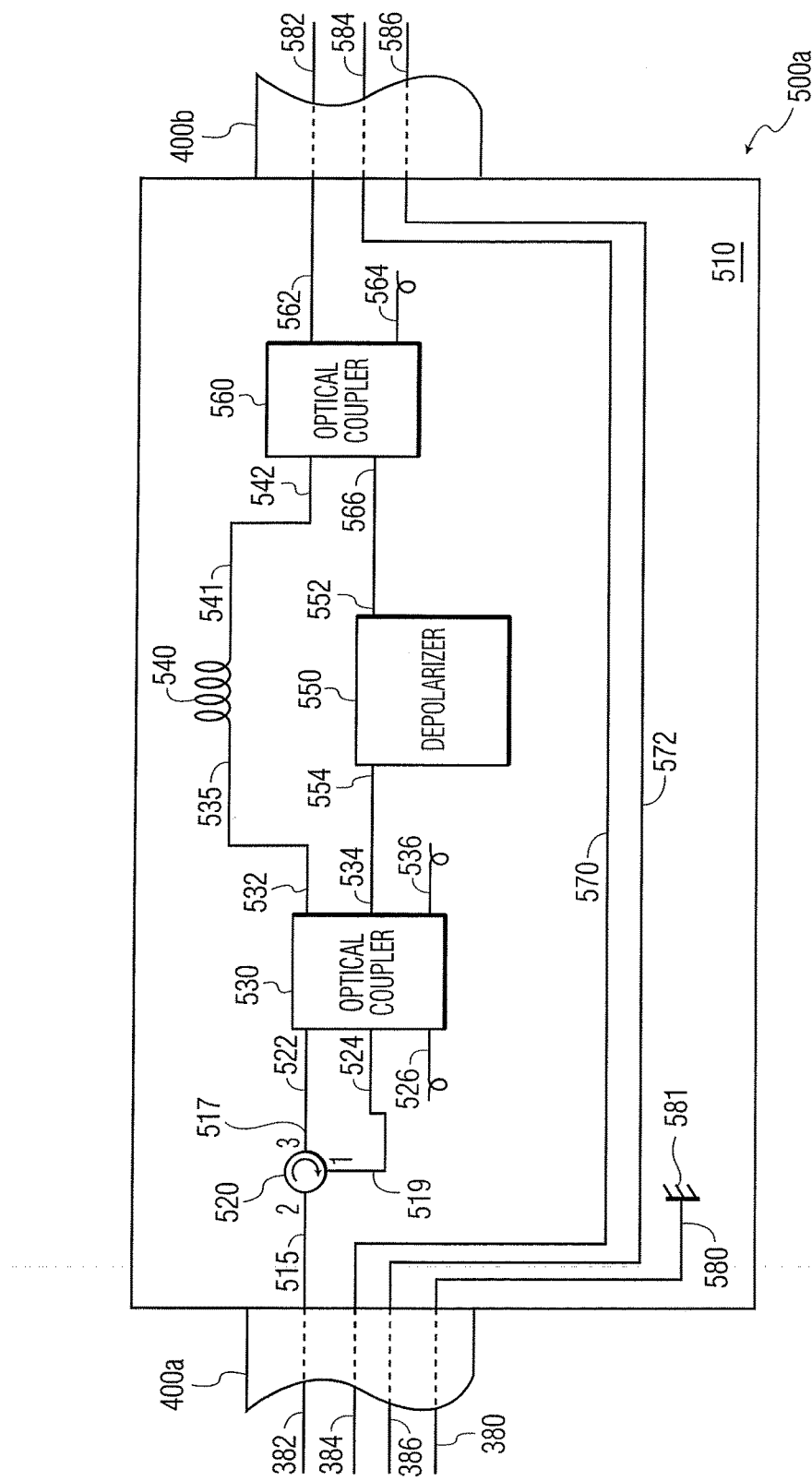
FIG. 4 is a block diagram of an intermediate field node of an optical detection system in accordance with an exemplary embodiment of the present invention.

Referring now to FIG. 4, fibers 384 and 386 in optical sensing cable 400a are connected to fibers 570, 572 in intermediate field node 500a, respectively. These are pass-through fibers not actively used in intermediate field node 500a, but rather to be used in connection with sensing in other nodes and zones. Fibers 570, 572 are connected to fibers 584, 586 in optical sensing cable 400b, respectively. Fiber 582 in optical sensing cable 400b is used for sensing within zone 455.

Fiber 382 from optical sensing cable 400a is connected to an input/output lead 515 of an optical circulator 520. The lead 517 of optical circulator 520 is connected to a lead 522 of an optical coupler 530 (e.g., a 3×3 fiber optic coupler 530). A lead 519 of optical circulator 520 is connected to a lead 524 of optical coupler 530.

A lead 532 of optical coupler 530 is connected to lead 535 of a delay coil 540. The fiber optic delay coil 540 has a length of, for example, at least twice the length of the zone 455 of optical fiber 582 in fiber optic sensing cable 400b where the midpoint of the sensing loop (e.g., from one output leg of the 3×3 coupler to another), including the sensing optical fiber 582 "unfolded" is within enclosure 510 for maximum sensitivity along the zone. A lead 541 of delay coil 540 is connected to a lead 542 of an optical coupler 560 (e.g., a 2×2 fiber optic coupler 560).

A lead 534 of optical coupler 530 is connected to a lead 554 of a depolarizer 550. A lead 526 of optical coupler 530 is tied off and/or the end crushed to minimize light that is reflected back into optical coupler 530. Similarly, a lead 536 of optical coupler 530 is tied off and/or the end crushed to minimize light that is reflected back into optical coupler 530. A lead 552 of depolarizer 550 is connected to a lead 566 of optical coupler 560. A lead 562 of optical coupler 560 is connected to fiber 582 in optical sensing cable 400b. A lead 564 of optical coupler 560 is tied off and/or the end crushed to minimize light that is reflected back into optical coupler 560. Although an exemplary optical coupler 560 is a 2×2 fiber optic coupler, the optical coupler 560 is not limited to that embodiment. For example, a 1×2 fiber optic coupler may be used instead of a 2×2 fiber optic coupler 560, thereby obviating the tying off of lead 564.

An exemplary operation of field node 500a shown in FIG. 4 is now provided. An optical signal (i.e., light from host node 100 entering field node 500a) propagates along fiber 382 to lead 515 and enters port 2 of optical circulator 520, and then exits port 3 of optical circulator 520 through lead 517, and then propagates along lead 522 (a length of optical fiber) to optical coupler 530. Optical coupler 530 divides the light into optical signals along two counterpropagating paths: a first path of the divided light extends from lead 532 to delay coil 540 along lead 535, and then from lead 541 to optical coupler 560 through lead 542; a second path of the divided light extends from lead 534 to depolarizer 550 through lead 554, and then from lead 552 to optical coupler 560 through lead 566. Thus, the light along the first path is delayed with respect to the light along the second path by a time approximately proportional to the length of delay coil 540. The two counterpropagating optical signals recombine at optical coupler 560, and the recombined optical signal exits optical coupler 560 along lead 562, and then travels along fiber 582 (for sensing within zone 455) of optical sensing cable 400b. The recombined optical signal enters field node 500b (see FIGS. 1A-1D) on fiber 582, and is reflected back (using a reflector in field node 500b similar to reflector 581 in field node 500a) along fiber 582 to field node 500a. This reflected signal is divided into two optical signals by optical coupler 560, where each of the optical signals travels along a counterpropagating path and recombines coherently at optical coupler 530. The result of the optical signals counter propagating through the node and zones and recombining at optical coupler 530 is that the recombined light has an intensity output proportional to the phase perturbation from the original disturbance along fiber 582 within optical sensing cable 400b. This optical signal (having a variable intensity) is output from optical coupler 530 along lead 524 (i.e., fiber 524) and then along lead 519 into port 1 of optical circulator 520. This optical signal propagates from port 1 to port 2 of optical circulator 520, and then along lead 515 to fiber 382 (and pass through fiber 370) to fiber 161 of lead cable 200. The signal is transmitted along fiber 161 of lead cable 200 to the interrogator of host node 100.

Figure 5:
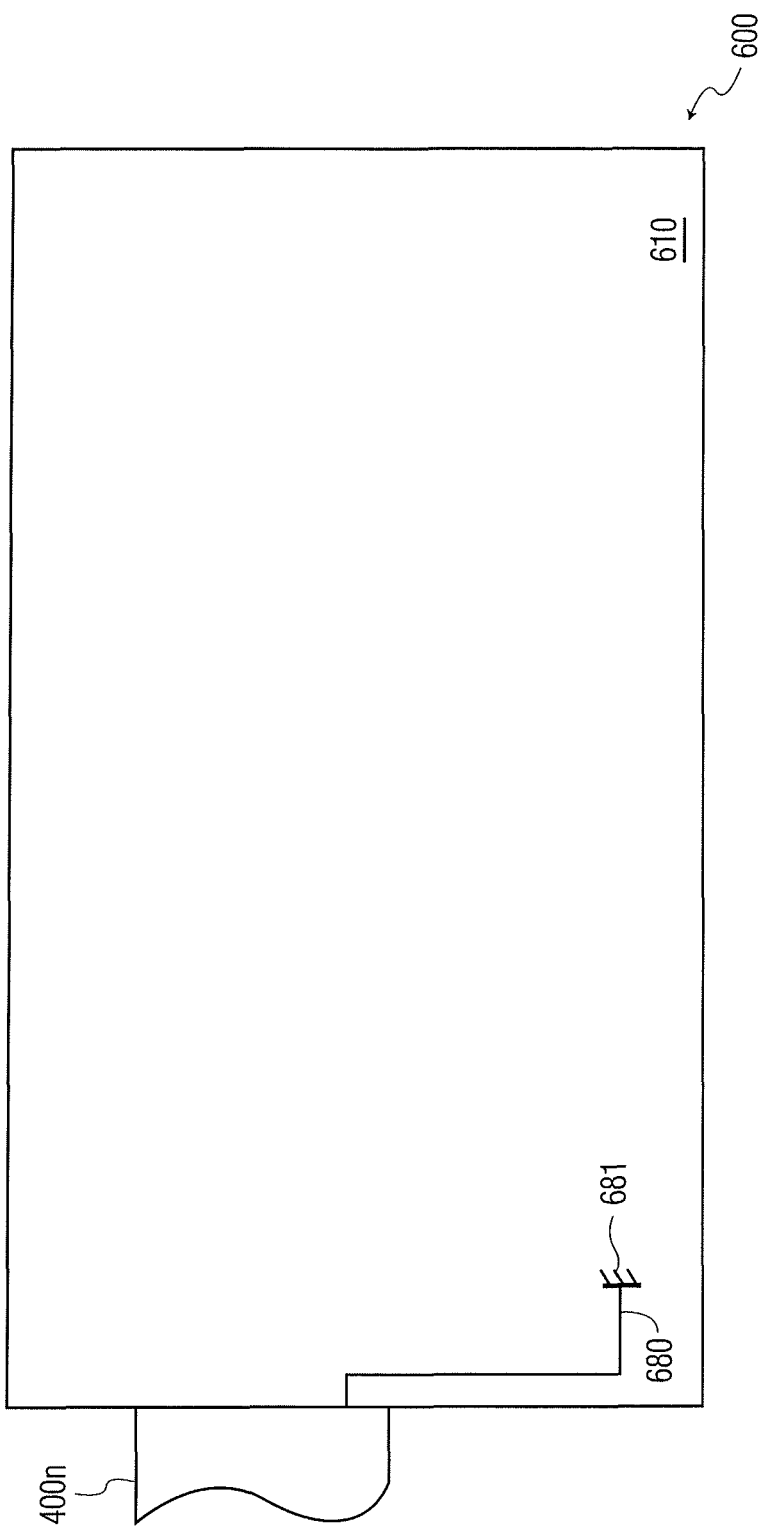
FIG. 5 is a block diagram of a final field node of an optical detection system in accordance with an exemplary embodiment of the present invention.

The pattern of field nodes 500a, 500b, etc. and optical sensing cables 400a, 400b, etc. is repeated, as desired, and utilizing the number of available optical fibers within the cable. Other system level topologies (e.g., branching, bi-directional/redundancy, etc.) are contemplated using this modular approach. Each optical sensing cable 400a, 400b, etc. may be used to provide an acoustically independent sensing zone. FIG. 5 illustrates final field node 600 including an enclosure 610 for receiving final optical sensing cable 400n. Optical sensing cable 400n includes a fiber 680 which is connected to a reflector 681 (e.g., broadband reflector 681).

Referring back to FIG. 2, optical intensity signals proportional to the phase perturbations within each zone (e.g., due to mechanical or acoustic vibrations sensed) are returned to host node 100 (which may be considered an interrogator) by way of fibers 160, 161, 162, and 163 and then through circulators 150a, 150b, 150c, and 150d after conversion from a phase signal to an intensity signal at coupler 330 or 530, etc. Circulators 150a, 150b, 150c, and 150d are configured to behave in such as way as to allow signals from fiber 160 to pass through to a fiber 174, for signals from fiber 161 to pass through to a fiber 173, for signals from fiber 162 to pass through to a fiber 172, and for signals from fiber 163 to pass through to a fiber 171. However, the circulators 150a, 150b, 150c, and 150d prevent light from passing from: fiber 160 or fiber 174 to fiber 140a; fiber 161 or fiber 173 to fiber 140b; fiber 162 or fiber 172 to fiber 140c; and fiber 163 or fiber 171 to fiber 140d, etc. Light from fiber 174 is converted to an electrical current signal at a photodetector 175. Likewise, light from fiber 173 is converted to an electrical current signal at a photodetector 176, light from fiber 172 is converted to an electrical current signal at a photodetector 177, and light from fiber 171 is converted to an electrical signal at a photodetector 178. The electrical signals converted by photodetectors 175, 176, 177, and 178 may be very low noise signals, and the photodetectors 175, 176, 177 and 178 may have dark current less than about 0.5 nA.

The outputs of photodetectors 175, 176, 177, and 178 are then amplified using transimpedance amplifiers 180 (e.g., amplifiers of very low distortion (less than −40 dB), high gain bandwidth (on the order of 500-2,000 MHz), and noise less than 1 nV/√Hz (such as the model AD8099, produced by Analog Devices, Inc.)). Multiple stages of further amplification may follow each transimpedance amplifier 180 as is known by those skilled in the state of the art. The electrical outputs of amplifiers 180 are filtered using filters 181. Use of high quality photodetectors, amplifiers, and filters desirably produces signals with fidelity sufficient for advanced signal processing desired for robust classification of detected events and alarm generation (or other indications based on mechanical/acoustic vibration) without false alarms. The signals output from filters 181 are sampled by A/D converters (ADCs) 182. The sampled electrical signals from ADCs 182 are received by one or more Field Programmable Gate Arrays (FPGAs) 184.

FPGAs 184 may be configured to perform high speed signal pre-processing. Such FPGAs 184 are typically used to perform filtering and Fast Fourier Transforms (FFTs) of the sampled data from each zone to determine the instantaneous spectrum of the disturbance(s) along each zone. Further processing is performed by a microprocessor 186 as shown in FIG. 2. Communication with outside security system processors and other peripheral devices is accomplished with an interface chip 188. Interface chip 188 may be for example, an RS-232 interface chip or a USB transceiver.

An exemplary signal processing sequence is accomplished as follows. From each sensing zone (e.g., zone 450, zone 455, zone 460, etc.), ADCs 182 digitize a set of data samples (e.g., at an exemplary rate of 8192 samples per second). In such an example, FPGA 184 performs a 8192 sample FFT to produce spectra, which are output to the microprocessor 186. Microprocessor 186 groups the spectra output from FPGA 184 into data windows (e.g., on the order of 0.25 seconds).

In such an example, a series of spectral masks are created by processing signals generated during the introduction of known events (where such events may be configured depending upon the application). In a mine monitoring application such an event may be a characteristic of an individual miner's beacon, a characteristic of an individual miner's voice in a mine, etc. Spectra generated by FPGA 184 during these events are saved, for example, in a database, a look-up table, or other data storage techniques. Each of these spectral masks is further modified to create a dynamic signal threshold. The spectrum of the received data within each data window is compared to the signal thresholds. A persistence requirement is established that requires "m" spectra to exceed a spectral mask for every "n" contiguous time windows which, when true, is reported as an alarm condition or as the detection (existence) of a particular beacon in or near a specific zone. The use of persistence helps minimize false alarms due to instantaneous (non-alarm) events of high energy.

The dynamic threshold is continually updated by multiplying a user-defined coefficient to a single value is calculated for each frequency band within a spectrum by summing the values of a common frequency band from all of the zones in an environmental zone (where the environmental zone is a set of real sensing zones artificially grouped by the user). These values are integrated over a user-defined time span. This dynamic threshold is used to compensate for non-instantaneous environmental effects impacting multiple zones (e.g., lasting on the order of seconds to hours), such as rain, hail, highway traffic, trains, etc. The shorter this time span of the dynamic threshold integration, the more rapidly the dynamic threshold changes. The longer this time span, the more the dynamic threshold response is damped. In addition, the amount that any one instantaneous spectrum can bias the dynamic threshold can also be limited to prevent single events (such as an impact from a falling tree branch) from having an undue impact upon the threshold.

Electrical outputs from ADCs 182 in host node 100 may be combined and distinguished by use of a multiplexer, switch, or other appropriate mechanism 1000 to an amplifier or line driver 1011 to provide an audio output of any zone desired by a user. Providing an audible output enhances the functionality of optical detection system 10 by enabling the user to hear the detected events as alarms are generated.

FIG. 6 is an external illustration of intermediate field node 500a (as opposed to the internal block diagram view shown in FIG. 4). Field node 510a includes enclosure 510, fiber optic microphone 510a, and fiber optic earplug 510b (where the function of microphone 510a and earplug 510b have been described above). Earplug 510b is connected to the internal portion of enclosure 510 using optical fiber 510b1. As field node 510a relates to node "n+1," it is understood that the cable for sensor "n" terminates at enclosure 510 (using a reflector or the like), and that the cable for sensor "n+1" exits from enclosure 510. As will be appreciated by those skilled in the art, any node (a first field node, an intermediate field node, a final field node, etc) may include the functions described in connection with FIG. 6 such as that of microphone 510a and earplug 510b.

Figure 7:
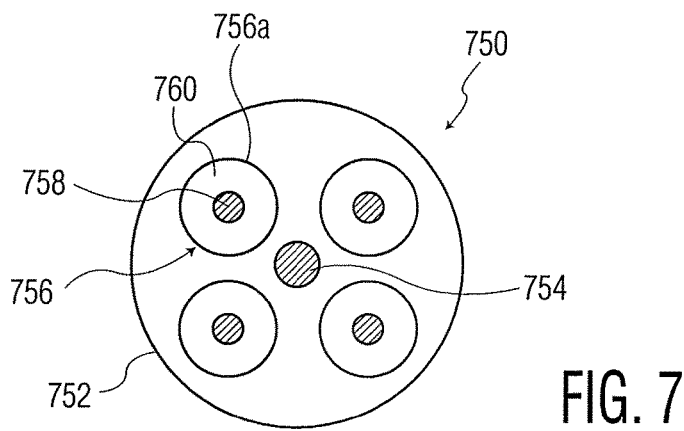
FIG. 7 is a cross-sectional view of a fiber optic cable in accordance with an exemplary embodiment of the present invention.

FIG. 7 is a cross sectional view of an optical sensing cable 750 including four fibers or strands (such as optical sensing cable 400a shown in FIGS. 3-4). Although a number of different sensing cable configurations are possible, optical sensing cable 750 shown in FIG. 7 includes an outer jacket 752 and one or more strength members 754. Strength member 754 provides longitudinal tensile strength to sensing cable 750 as well as some bend-limiting for the benefit of the reliability of elements contained within sensing cable 750. Outer jacket 752 may be made from, for example, one of a series of common elastomer/rubber materials such as polyurethane, polyethylene, butyl, or nitrile. Cable 750 may include sub units 756. Each sub unit 756 contains a jacket 756a (e.g., a PVC jacket), a strength layer 760 (e.g., formed from a material such as a stainless steel, polyimide fiber like the Kevlar® polyimide fiber marketed by E.I. duPont de Nemours & Co., Inc. of Wilmington, Del.), and an optical fiber 758. Optical fiber 758 may include a jacket (not shown) formed from a material such as Hytrel® thermoplastic polyester elastomers marketed by E.I. duPont, nylon, or silicone.

Figure 8:
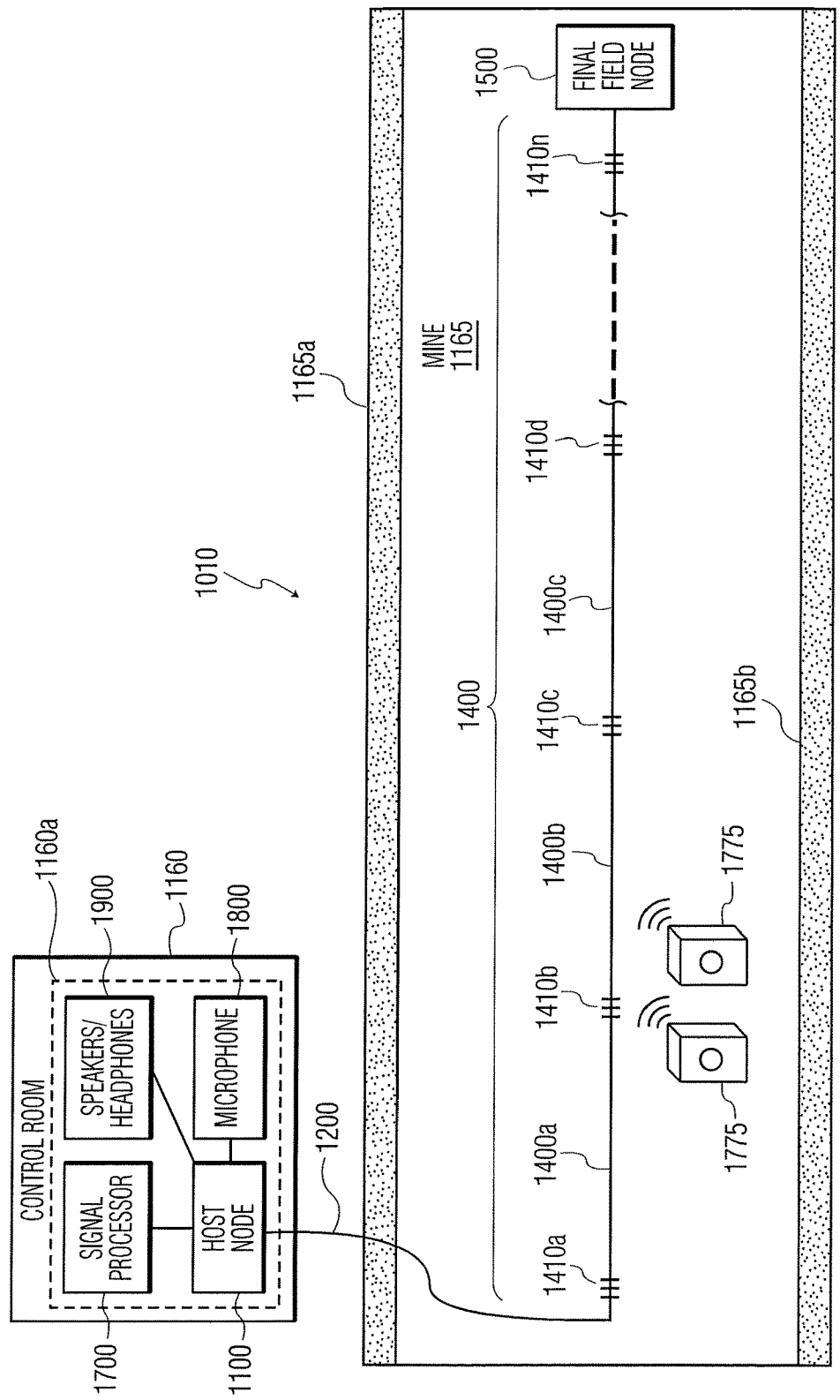
FIG. 8 is a block diagram illustrating another optical detection system used in connection with a mine in accordance with an exemplary embodiment of the present invention.

The optical detection systems 10 shown in FIGS. 1A-1D relate to a linearized Sagnac type of architecture; however, the present invention is not limited to such an architecture. One example of an alternative architecture is a Time Division Multiplexing (TDM) system optical architecture such as that shown in FIG. 8. In this embodiment, a personnel safety system 1010 is configured as an infinite impulse response interferometer array. The functions of various of the elements described in connection with FIG. 8 are similar to those described above in connection with FIGS. 1A-1D. A control room 1160 includes control room electronics 1160*a*. Control room electronics 1160*a* includes a host node 1100 (including an interrogator), a signal processor 1700, a microphone 1800, and speakers/headphones 1900. Host node 1100 is connected to an optical sensing cable 1400 using a lead cable 1200, where lead cable 1200 extends into a mine 1165 (below the ground level 1165*a* and the above mine floor 1165*b*).

Optical sensing cable 1400 contains a series of interferometers (e.g., Fabry-Perot interferometers) that are each a segment of an optical fiber of optical sensing cable 1400. The interferometers are bounded by a pair of Fiber Bragg Gratings (FBGs). More specifically, segment 1400*a* is bounded by FBGs 1410*a*, 1410*b*. Likewise, segment 1400*b* is bounded by FBGs 1410*b*, 1410*c*. Likewise, segment 1400*c* is bounded by FBGs 1410*c*, 1410*d*, and so on, until the final segment terminates at FBG 1410*n*. According to an exemplary embodiment of the present invention, each of the FBGs (e.g., 1410*a*, 1410*b*, 1410*c*, 1410*d*, 1410*n*) are periodic perturbations to the crystallographic structure of the fiber. Such perturbations may be created by an interference pattern using a laser beam as is well known by those skilled in the art. Exemplary ones of the FBGs have a peak reflection on the order of one percent, and have a spectral width (full width at half maximum or FWHM) of typically 4-6 nm. The center wavelength of exemplary FBGs is dependent upon the type of multiplexing used within the system. The purposes of the interrogator (within host node 1100) are to illuminate the array of interferometers (e.g., with very narrow line width light, for example, on the order of 0.1-10 kHz FWHM) and to provide an electrical output which is proportional to the acoustic input to each interferometer. An example of such an interrogator, which includes the optical source, is a low phase noise laser such as an external cavity laser or a fiber laser. A phase signal is imposed upon the light, which is also pulsed, with pulse widths equal to twice the distance between adjacent FBGs. The pulses are transmitted to the linear sensor array including the interferometers. The interferometers (e.g., the fiber segments bound by a pair of FBG gratings) sense acoustic and/or mechanic vibrations (e.g., an emission from a beacon 1775), and after return from the linear sensor array to host node 1100, the optical signals (having been perturbed by phase changes caused by vibrations, etc.) are demodulated (e.g., down converted) and available for post processing (e.g., spectral analysis, mask comparison, etc.) by processor 1700 (e.g., a microprocessor, a PC, etc.) where such vibration is processed to interpret the event (e.g., to understand the location of the miner, etc. by detecting unique beacon outputs).

In certain exemplary embodiments of the present invention, a separate fiber within the optical sensing cable carries the light/optical signal that contains the voice information (e.g., voice information from the control room to an earplug at a field node, etc.). FIG. 8 also illustrates a field node 1500 which may be similar to node 500*a* shown in FIG. 6. Final field node 1500, which is illustrated at the end of cable 1400, may be placed in any position in mine 1165 as desired, and, for example, a plurality of field nodes may be provided along cable 1400. Because final field node 1500 may include a fiber optic microphone and earplug (as shown in FIG. 6), and because control room electronics 1160*a* include microphone 1800 and speakers/headphones 1900, the bi-directional communication (without need for local electrical power) described above with respect to optical detection system 10 of FIGS. 1A-1D is also provided by personnel safety system 1010 of FIG. 8. Use of a TDM system architecture is not limited to mine safety applications such as is shown in FIG. 8. Rather, such an architecture may be used in any of a number of personnel safety and/or monitoring applications such as marine safety (FIG. 1C), and vehicle monitoring (FIG. 1D), amongst others.

Figure 9:
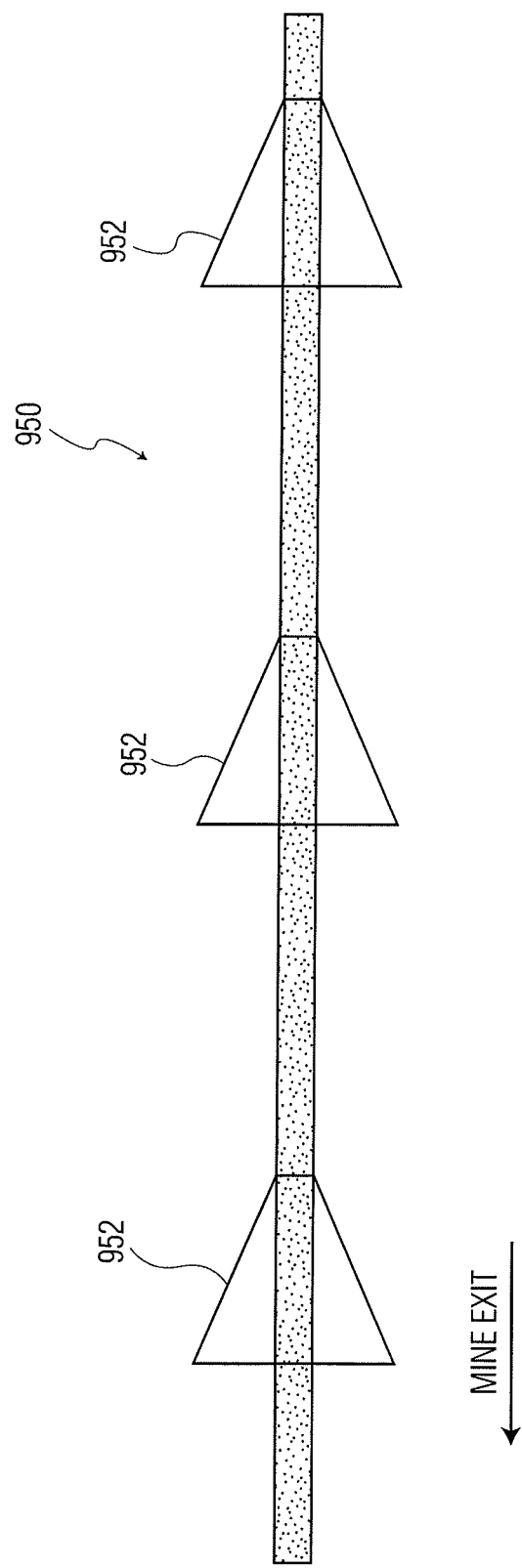
FIG. 9 is a view of a length of cable in a personnel safety system in accordance with an exemplary embodiment of the present invention.

As will be appreciated by those skilled in the art of mine safety, it is also desirable to provide miners with passive ways to move toward a mine exit in the event of a power failure (where there is no light to indicate the direction of the mine exit). In some applications, cones have been strung along a line of a wall of the mine, thereby creating a lifeline. When a miner runs a hand along the line, the miner feels the cones. When the cones extend from small end to large end, the miner knows that he or she is heading toward the mine exit. In contrast, when the cones extend from large end to small end, the miner knows that he or she is not heading toward the mine exit. In accordance with the present invention, a fiber cable (e.g., cable 1400 shown in FIG. 8, segments 400*a*, 400*b*, . . . 400*n* shown in FIG. 1B, etc.) may be used to perform such a directional function in addition to its function of transmitting optical information. FIG. 9 illustrates a cable 950 including a plurality of cone shaped structures 952 disposed thereon. As described above, a miner may feel cable 950 as he or she heads in a given direction to be certain that he or she is heading toward the mine exit.

Figure 10:
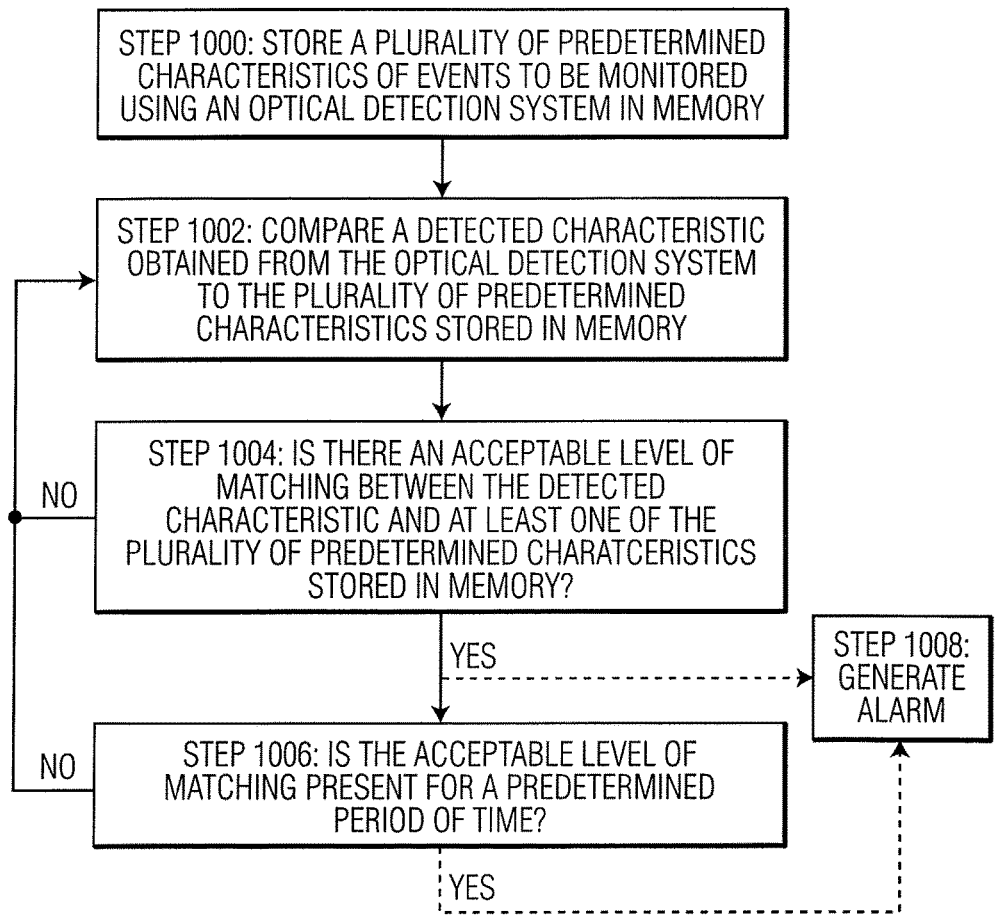
FIG. 10 is a flow diagram illustrating a method of operating an optical detection system in accordance with an exemplary embodiment of the present invention.

The present invention also includes methods of operating optical detection systems such as the optical detection systems illustrated and described in connection with FIGS. 1A-1D and FIGS. 2-8 (in connection with personnel safety applications). FIG. 10 illustrates an example of such a method implemented in a closed-loop fashion. At step 1000, a plurality of predetermined characteristics of events (e.g., characteristics of individual miner's beacons such as a temporal characteristic an example of which is a pulse train carrier as part of a code division multiple access methodology, characteristics of miner's voices in a mine, etc.) to be monitored using an optical detection system are stored in memory. By "predetermined" is meant determined beforehand, so that the predetermined characteristic must be determined, i.e., chosen or at least known, in advance of some event such as implementation of the method. Depending upon the application of the optical detection system, such events (and therefore, the predetermined characteristics of such events) may vary broadly. For example, in a mine safety application, exemplary events may include miner's voices in a mine, beacon transmissions of a miner, etc. In a marine personnel monitoring application, such events may include sailor's voices in an area of a ship (e.g., a compartment of a large vessel), beacon transmissions of a sailor, etc.

Further still, the characteristics of the events provided may vary broadly. As provided above, such a characteristic may be a spectra or a spectrum of a known event. Such a spectrum may be an energy profile over a plurality of frequencies, etc.

In one specific example, in order to provide the characteristics at step 1000, a number of sub steps are completed. In a first substep, a windowing function (such as a Hanning function or Beckman function) is applied to a sampled set of data points within a series of time windows during a series of known events (e.g., beacon transmissions, talking, etc.). In a second substep, a spectrum is created by applying a Fast Fourier Transform (FFT) on the windowed data. In a third substep, the spectrum is scaled in a way to include a population of system responses to a series of similar events (e.g., in such a way as to minimize false alarms) to create a spectral mask. In a fourth substep, the resultant spectral mask is associated with each event and is stored in a data structure (e.g., a database or other similarly retrievable structure).

At step 1002, a detected characteristic obtained from the optical detection system during normal operation (e.g., obtained from the host node by processing of optical intensity information received from the various field nodes and sensing zones) is compared to the plurality of predetermined characteristics stored in memory. Referring again to the spectra example described above, step 1002 may include two substeps. In a first substep, windowed samples of data are acquired during normal operation, and spectra of this data are generated as a function of time. Then, in a second substep, the spectra generated during normal operation are compared to those previously associated with alarm events and stored (e.g., compared to the characteristic provided in step 1000).

At step 1004, a determination is made as to whether there is an acceptable level of matching between the detected characteristic from step 1002 and at least one of the plurality of predetermined characteristics stored in memory in step 1000. If there is no such acceptable level of matching (i.e., a "No" answer at step 1004), then the process returns to step 1002 and further comparisons are made with updated data. If there is such an acceptable level of matching (i.e., a "Yes" answer at step 1004) then an alarm (or other notation such as an updated detection log or display) may be generated at step 1008.

As will be appreciated by those skilled in the art, certain types of events may be of a momentary nature, and a momentary match (i.e., a momentary acceptable level of matching at step 1004) may suffice to generate an alarm at step 1008. However, other types of events may be of such a type where it is appropriate to confirm that the event continues for a predetermined period of time. In such a case, even if there is such an acceptable level of matching (i.e., a "Yes" answer at step 1004), the process may not immediately generate an alarm, but may rather proceed to step 1006 where a determination is made as to whether the acceptable level of matching is present for a predetermined period of time (e.g., or apply a persistence test to the processed operational data to see if it exceeds an alarm threshold, where such threshold may be the predetermined period of time, or some other threshold). If the answer at step 1006 is "Yes," then an alarm is generated at step 1008. If the answer at step 1006 is "No," then the process proceeds to step 1002 for continued monitoring. The step 1006 of determining if the acceptable level of matching is present for a predetermined period of time can be accomplished in a closed loop fashion wherein a counter is updated for each incremental time period during which there is an acceptable level of matching.

Figure 11:
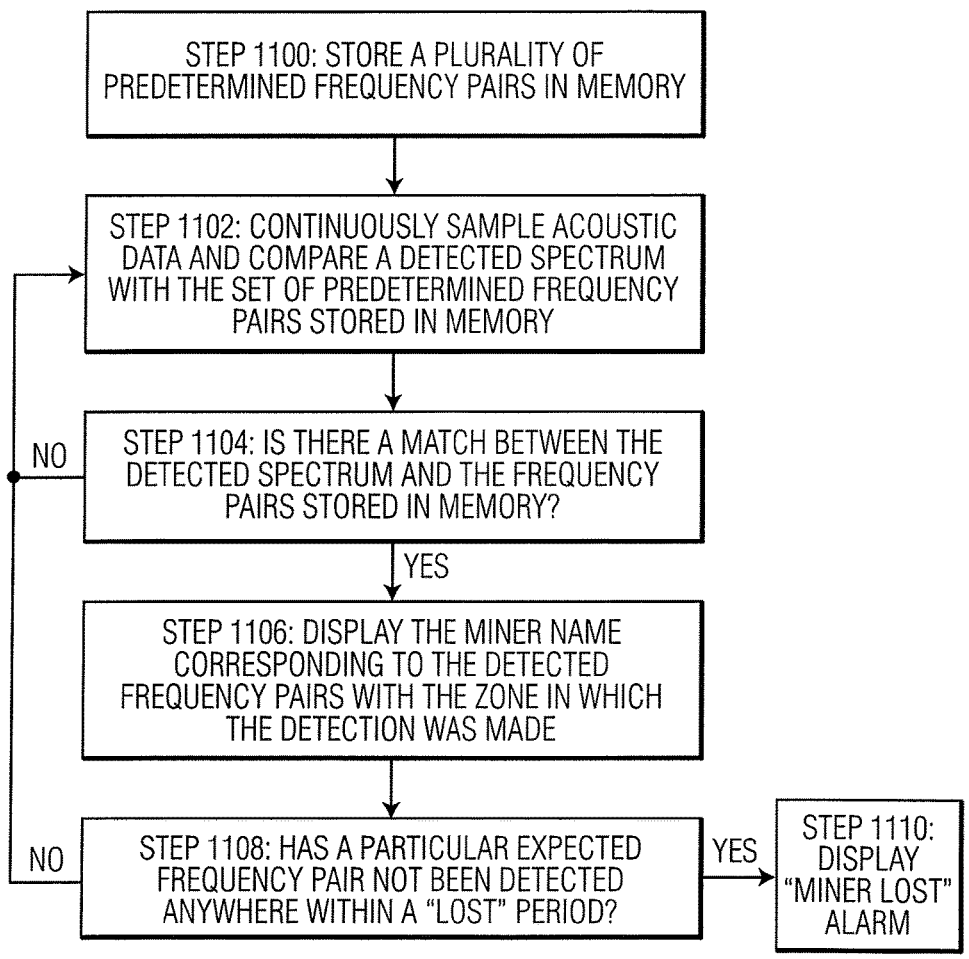
FIG. 11 is a flow diagram illustrating another method of operating an optical detection system in connection with a mine in accordance with an exemplary embodiment of the present invention.

FIG. 11 illustrates another method of operating an optical detection system in accordance with an exemplary embodiment of the present invention, in connection with personnel safety applications. At step 1100, a plurality of predetermined frequency pairs (e.g., frequency pairs associated with personnel beacons) are stored in memory. At step 1102, acoustic data (e.g., a detected spectrum associated with the data) are continuously sampled and compared with the set of predetermined frequency pairs stored in memory. At step 1104, a determination is made as to whether there is a match between the detected spectrum and the frequency pairs stored in memory. If the answer at step 1104 is "No," the process returns to step 1102 for additional sampling. If the answer at step 1104 is "Yes," the method proceeds to step 1106 where the personnel member's name/identifier (e.g., the miner's name/identifier, etc.) corresponding to the detected frequency pairs is displayed within the sensing zone in which the detection was made.

At step 1108 a determination is made as to whether a particular expected frequency pair (e.g., a miner's beacon signal) has not been detected anywhere within a predetermined period (e.g., a time period after which a miner/personnel member is considered lost). If the answer at step 1108 is "Yes," the process proceeds to step 1110 where an alarm is generated (e.g., a "Miner Lost" alarm, a "Sailor Lost" alarm, or other "Personnel Member Lost" alarm, etc.). If the answer at step 1108 is "No," the process returns to step 1102 for additional sampling. It should be noted that beacons (e.g., beacons 775/1775), and hence steps 1102/1104 in FIG. 11, may operate the frequencies in tandem rather than simultaneously.

Although the present invention has largely been described in connection with monitoring of miners (e.g., a miner safety application), it is not limited to such embodiments. For example, the personnel safety system may be used in connection with any of a number of personnel monitoring applications.

The optical fibers and cables illustrated and described herein may be arranged in any desired configuration. For example, each of the fibers may be provided in a single length between elements, or in multiple lengths, as desired. In a specific example, fiber 160 in FIG. 3 connects to port 2 of optical circulator 320 through lead 315; however, it is understood that lead 315 may be part of fiber 160 if desired. Likewise, port 3 of optical circulator 320 and optical coupler 330 are connected through leads 317 and 322; however, it is understood that leads 317 and 322 may be part of the same length of optical fiber if desired.

Although the present invention has primarily been described in connection with lengths of optical sensing cable 400a, 400b, etc. sensing disturbances (e.g., as in FIGS. 1A-1D), the present invention is not limited to such embodiments. For example, one or more point sensing transducers may be integrated into each of the sensing zones. Such point sensing transducers may be used to sense a disturbance at a specific "point" along a sensing cable segment as opposed to general sensing anywhere along the sensing cable segment. Further, such point sensing transducers may include elements or structure distinct from (and in addition to) the sensing cable segment.

Although the present invention has been described in connection with certain exemplary elements (e.g., the elements illustrated and described in connection with FIGS. 2-5), it is not limited to those elements. The optical detection system may use any of a number of types of components within the scope and spirit of the claims.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of operating a personnel monitoring system comprising:
   (a) storing a plurality of predetermined characteristics of events to be monitored using an optical detection system in memory;
   (b) comparing a detected characteristic obtained from the optical detection system to the plurality of predetermined characteristics stored in memory; and
   (c) determining if there is an acceptable level of matching between the detected characteristic and at least one of the plurality of predetermined characteristics stored in memory,
   wherein, if it is determined that there is an acceptable level of matching at step (c), the method further comprises the step of (d) determining if the acceptable level of matching is present for a predetermined period of time in a closed loop configuration wherein a counter is updated for each incremental time period during which there is an acceptable level of matching.

2. The method of claim 1 further comprising the step of generating an alarm condition if it is determined that there is an acceptable level of matching at step (c).

3. A method of operating a personnel monitoring system comprising:
   (a) storing a plurality of predetermined characteristics of events to be monitored using an optical detection system in memory;
   (b) comparing a detected characteristic obtained from the optical detection system to the plurality of predetermined characteristics stored in memory; and
   (c) determining if there is an acceptable level of matching between the detected characteristic and at least one of the plurality of predetermined characteristics stored in memory,
   wherein, if it is determined that there is an acceptable level or matching at step (c), the method further comprises the step of (d) determining if the acceptable level of matching is present for a predetermined period of time,
   further comprising the step of generating an alarm condition if it is determined that the acceptable level of matching is present for a predetermined period of time in step (d),
   wherein step (a) Includes: (a1) applying a windowing function to a sampled set of data points within a series of time windows during a series of known events; (a2) creating a spectrum by applying a Fast Fourier Transform (FFT) to the set of data points to which the windowing function has been applied; (a3) scaling the spectrum to Include a population of system responses to a series of similar events to create a spectral mask; (a4) associating the spectral mask with each of the series of known events; and (a5) storing the associated spectral mask in a data structure accessible by the optical detection system.

4. The method of claim 3 wherein step (b) Includes: (b1) acquiring windowed samples of data during operation of the optical detection system; (b2) generating spectra of the windowed samples of data as a function of time; and (b3) comparing the spectra generated in step (b2) to the spectral mask stored in step (a5) of step (a).

* * * * *

UNITED STATES PATENT AND TRADEMARK OFFICE
CERTIFICATE OF CORRECTION

PATENT NO. : 10,107,886 B2
APPLICATION NO. : 15/644322
DATED : October 23, 2018
INVENTOR(S) : Goldner et al.

It is certified that error appears in the above-identified patent and that said Letters Patent is hereby corrected as shown below:

In the Claims

Claim 3, Column 18, Line 9 should read:
level of matching at step (c), the method further com- Claim 3, Column 18, Line 17 should read:
wherein step (a) includes: (a1) applying a windowing Claim 3, Column 18, Line 23 should read:
spectrum to include a population of system responses Claim 4, Column 18, Line 1 should read:
The method of claim 3 wherein step (b) includes: (b1)

Signed and Sealed this
Fifth Day of March, 2019

Andrei Iancu
*Director of the United States Patent and Trademark Office*